(12) United States Patent
Perkins et al.

(10) Patent No.: US 12,237,809 B2
(45) Date of Patent: Feb. 25, 2025

(54) ACTIVE COMPONENT INDICATORS FOR PHOTOVOLTAIC SYSTEMS

(71) Applicant: GAF Energy LLC, Parsippany, NJ (US)

(72) Inventors: Richard Perkins, San Jose, CA (US); Babak Farhangi, Kew Gardens Hills, NY (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/325,381

(22) Filed: May 30, 2023

(65) Prior Publication Data

US 2023/0396213 A1 Dec. 7, 2023

Related U.S. Application Data

(60) Provisional application No. 63/349,389, filed on Jun. 6, 2022.

(51) Int. Cl.
*H02S 50/10* (2014.01)
*H02S 20/23* (2014.01)
(Continued)

(52) U.S. Cl.
CPC .............. *H02S 50/10* (2014.12); *H02S 20/23* (2014.12); *H02S 40/34* (2014.12); *H02S 40/36* (2014.12)

(58) Field of Classification Search
CPC .......... H02S 50/10; H02S 20/23; H02S 40/34; H02S 40/36
See application file for complete search history.

(56) References Cited

U.S. PATENT DOCUMENTS

| 1,981,467 A | 11/1934 | Radtke |
| 3,156,497 A | 11/1964 | Lessard |

(Continued)

FOREIGN PATENT DOCUMENTS

| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Sadie White
(74) *Attorney, Agent, or Firm* — GREENBERG TRAURIG, LLP

(57) ABSTRACT

A system includes a plurality of photovoltaic modules installed and arranged in an array on a roof deck. Each of the photovoltaic modules includes a wire cover bracket configured to receive at least one electrical component. A rapid shutdown device is electrically connected to the at least one electrical component. The rapid shutdown device is configured to reduce an electrical voltage of the system to a predetermined voltage level. At least one visible indicator is electrically connected to the plurality of photovoltaic modules. The at least one visible indicator is activated when the electrical voltage of the system is less than or equal to the predetermined voltage level.

20 Claims, 22 Drawing Sheets

(51) Int. Cl.
*H02S 40/34* (2014.01)
*H02S 40/36* (2014.01)

(56) References Cited

U.S. PATENT DOCUMENTS

| | | |
|---|---|---|
| 3,581,779 A | 6/1971 | Gilbert, Jr. |
| 4,258,948 A | 3/1981 | Hoffmann |
| 4,349,220 A | 9/1982 | Carroll et al. |
| 4,499,702 A | 2/1985 | Turner |
| 4,636,577 A | 1/1987 | Peterpaul |
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,545,211 B1 * | 4/2003 | Mimura .................. H02S 50/10 52/173.3 |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eifert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B2 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko et al. |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |

(56) References Cited

U.S. PATENT DOCUMENTS

| | | |
|---|---|---|
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0062078 A1* | 4/2003 | Mimura ............ H01L 31/044 136/244 |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2004/0211456 A1* | 10/2004 | Brown ............... H02S 20/23 248/163.1 |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0000174 A1* | 1/2008 | Flaherty ............. H01L 31/042 52/173.3 |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0182532 A1* | 7/2009 | Stoeber ......... H01L 31/02021 340/661 |
| 2009/0229652 A1 | 9/2009 | Mapel et al. |
| 2009/0275247 A1 | 11/2009 | Richter et al. |
| 2009/0293932 A1* | 12/2009 | Augenbraun ..... H01L 31/02008 136/244 |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0183540 A1* | 7/2011 | Keenihan ............. H01L 31/048 439/345 |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1* | 9/2012 | Gangemi ............. F24S 25/632 52/173.3 |
| 2012/0260977 A1 | 10/2012 | Stancel |
| 2012/0266942 A1 | 10/2012 | Komatsu et al. |
| 2012/0279150 A1 | 11/2012 | Pisikak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0053892 A1* | 2/2014 | Seol .................. H02S 50/00 136/251 |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0329715 A1* | 11/2016 | Orr .................... G01R 31/54 |
| 2016/0359451 A1 | 12/2016 | Mao et al. |
| 2017/0054406 A1* | 2/2017 | Narla .................. H02J 3/381 |
| 2017/0099027 A1* | 4/2017 | Park ................... H02S 30/10 |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |

(56) References Cited

U.S. PATENT DOCUMENTS

| | | |
|---|---|---|
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 81 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

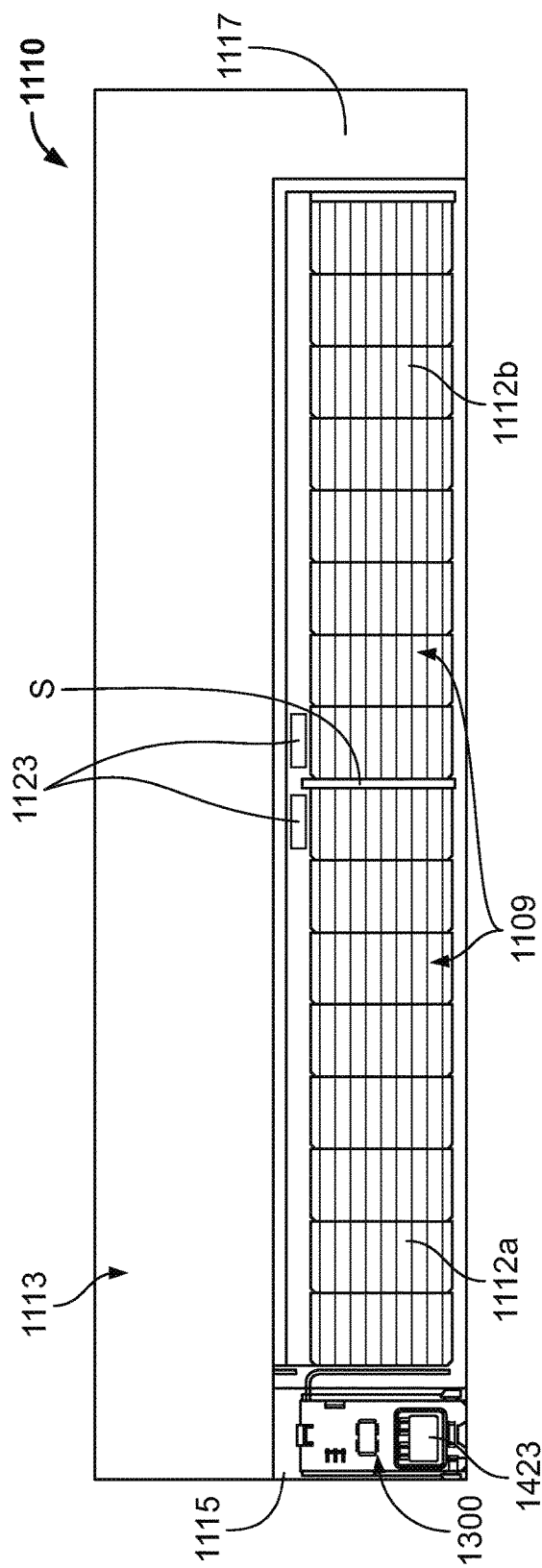
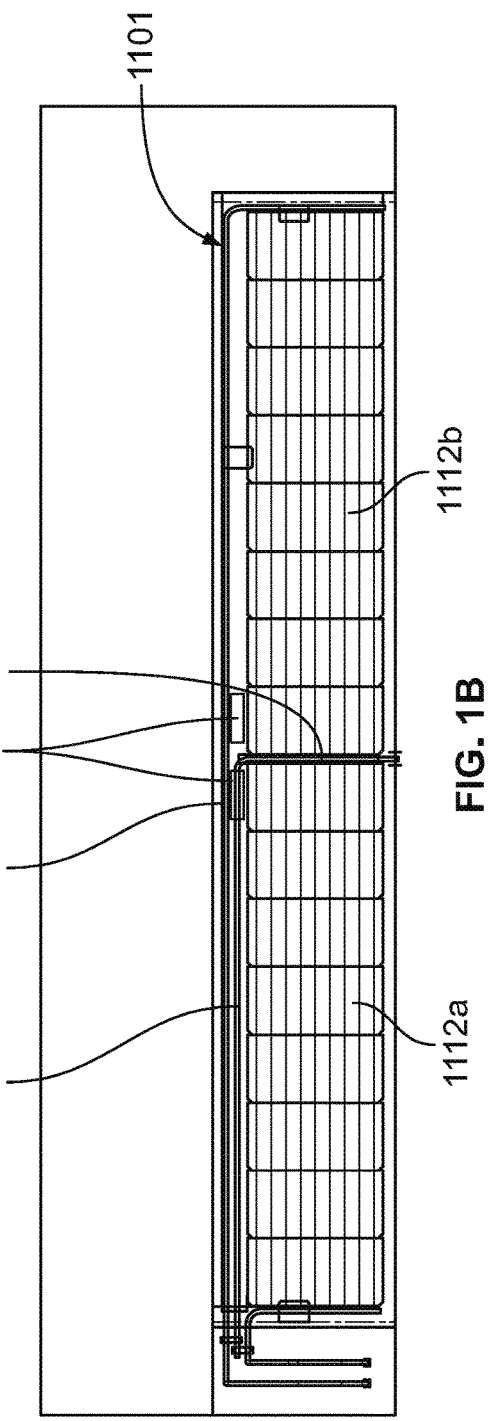
FIG. 1A
FIG. 1B

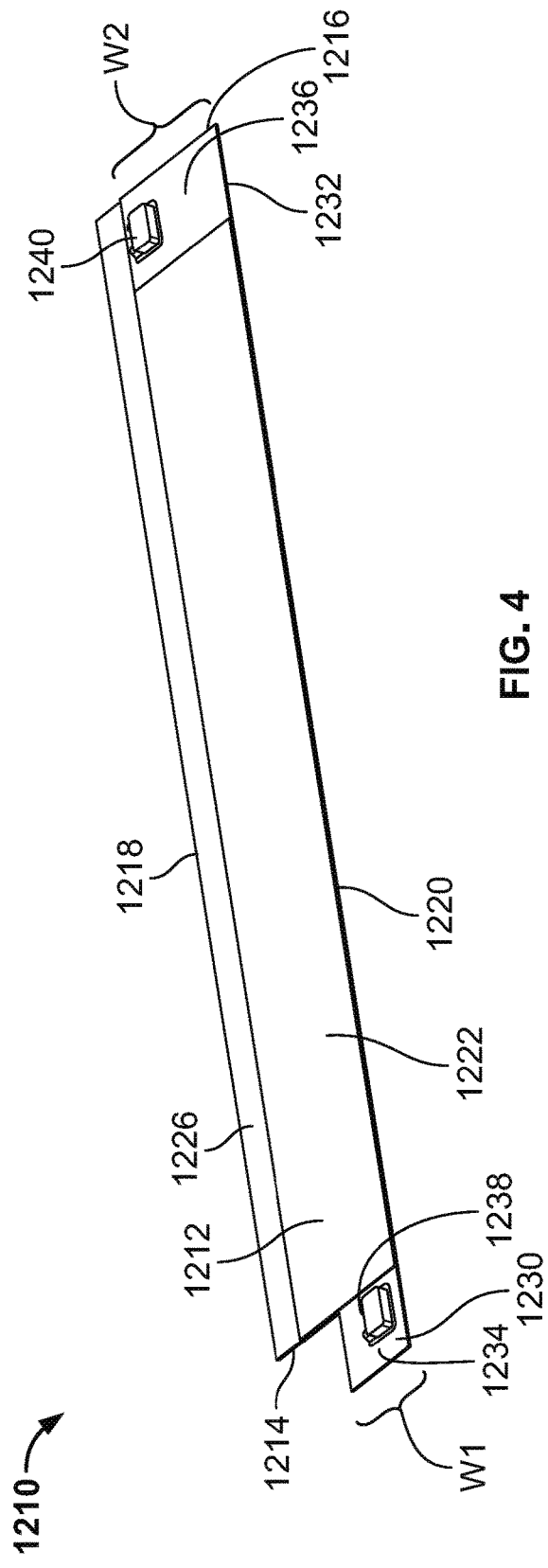
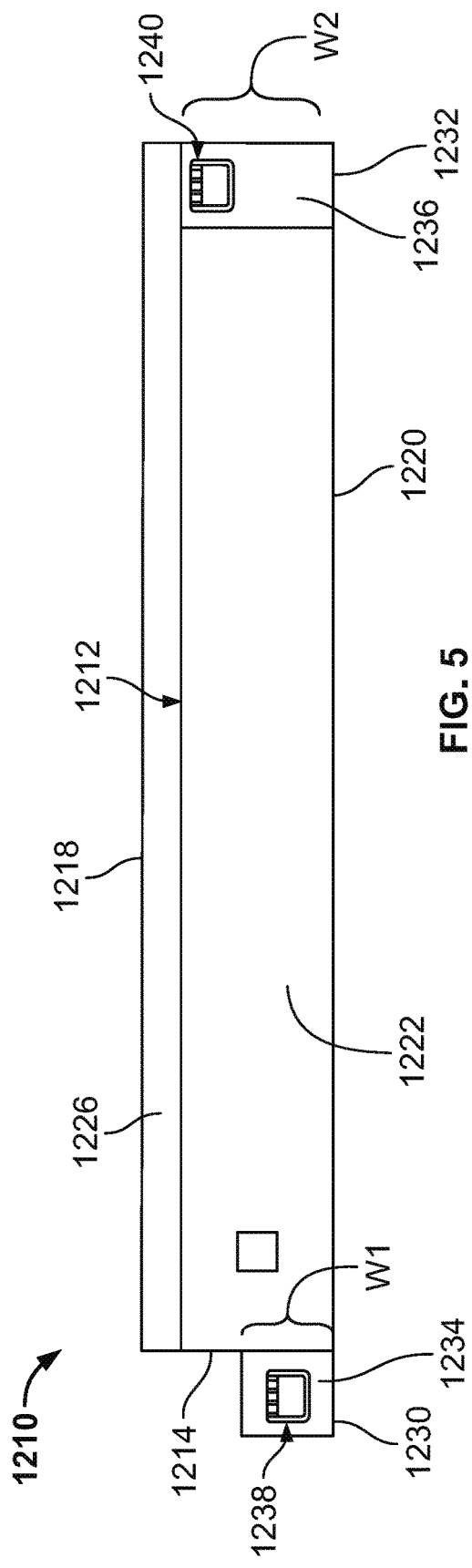

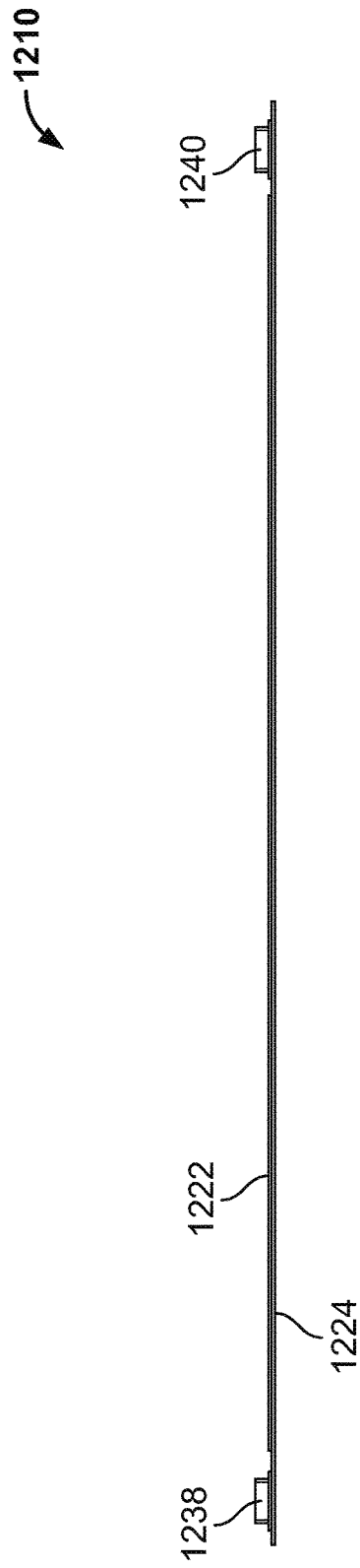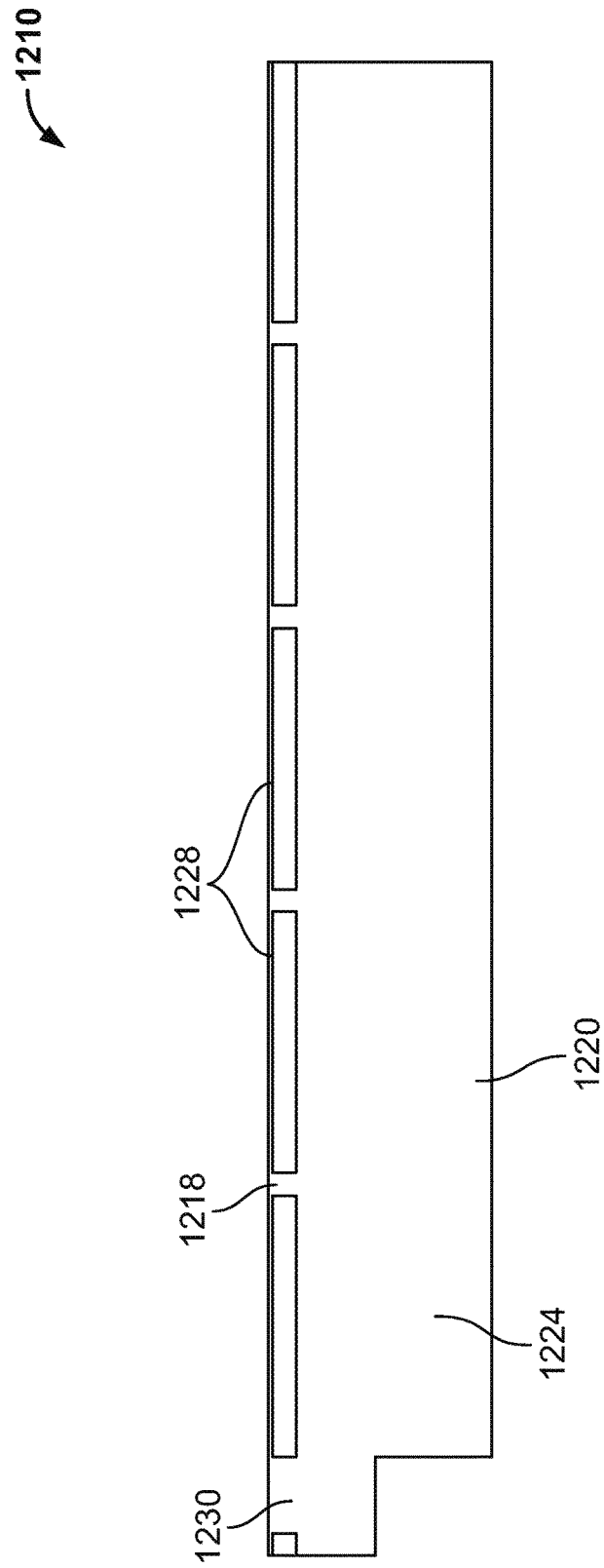

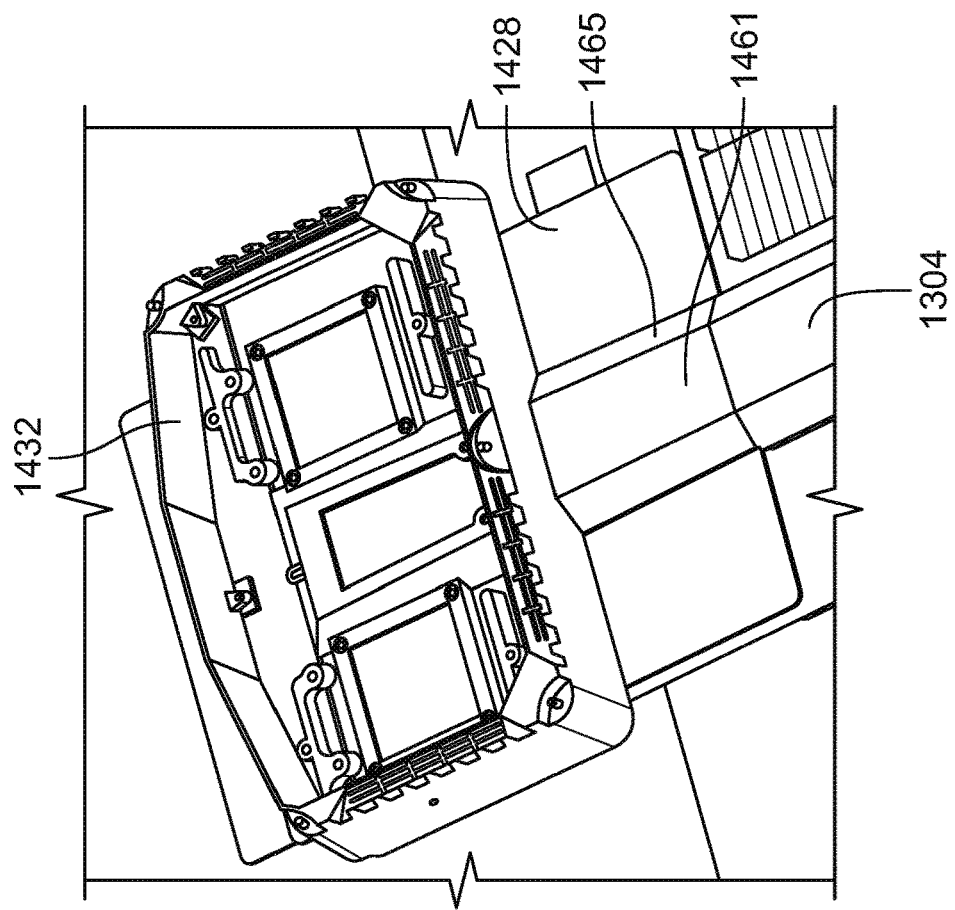
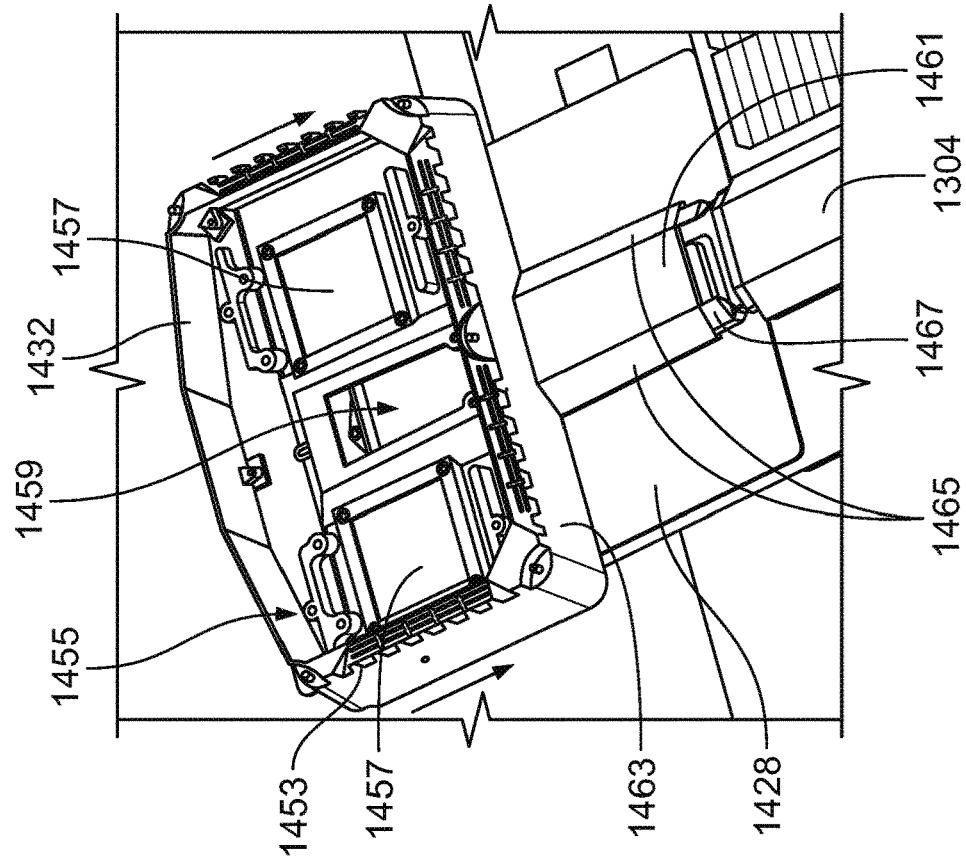

ACTIVE COMPONENT INDICATORS FOR PHOTOVOLTAIC SYSTEMS

CROSS-REFERENCE TO RELATED APPLICATION

This application is a Section 111(a) application relating to and claiming the benefit of commonly-owned, U.S. Provisional Patent Application Ser. No. 63/349,389, filed Jun. 6, 2022, entitled "ACTIVE COMPONENT INDICATORS FOR PHOTOVOLTAIC SYSTEMS," the contents of each of which are incorporated herein by reference in its entirety.

FIELD OF THE INVENTION

The present invention relates to active component indicators for photovoltaic systems.

BACKGROUND OF THE INVENTION

Photovoltaic systems having solar panels and other active components are commonly installed on roofing of structures.

SUMMARY OF THE INVENTION

In some embodiments, a system includes a plurality of photovoltaic modules installed on a roof deck, wherein the photovoltaic modules are arranged in an array on the roof deck, wherein the array includes a first subarray, wherein each of the photovoltaic modules includes a first end and a second end opposite the first end, at least one solar cell, and a wire cover bracket located at the first end, wherein the wire cover bracket is configured to receive at least one electrical component, wherein the wire cover brackets of the plurality of photovoltaic modules of the first subarray are configured to form a wireway; a rapid shutdown device, wherein the rapid shutdown device is electrically connected to the at least one electrical component, wherein the rapid shutdown device is configured to reduce an electrical voltage of the system to a predetermined voltage level; and at least one visible indicator, wherein the at least one visible indicator is electrically connected to the plurality of photovoltaic modules, wherein the at least one visible indicator is activated when the electrical voltage of the system is less than or equal to the predetermined voltage level.

In some embodiments, the at least one visible indicator is a light source. In some embodiments, the light source is a light emitting diode (LED). In some embodiments, the system further includes a transition box, wherein the transition box is located proximate to the wireway, wherein the rapid shutdown device is located within the transition box, wherein the at least one visible indicator is located within the transition box. In some embodiments, the at least one visible indicator is located within the wireway. In some embodiments, the at least one visible indicator is located within a corresponding one of the wire cover bracket. In some embodiments, the at least one visible indicator includes a plurality of visible indicators.

In some embodiments, the system further includes at least one cover removably attached to at least one of the wire cover brackets, wherein the at least one cover is configured to enable visible perception of the at least one visible indicator when the at least one visible indicator is active. In some embodiments, the system further includes at least one voltage monitoring device, wherein the at least one voltage monitoring device is configured to measure the electrical voltage. In some embodiments, the system further includes a jumper module, wherein the jumper module electrically connects the first subarray of the array and a second subarray of the array. In some embodiments, the jumper module includes a first junction box, wherein the at least one electrical component includes a second junction box, wherein the first junction box is electrically connected to the second junction box, and wherein the first junction box includes the at least one voltage monitoring device. In some embodiments, the jumper module includes a plurality of layers, wherein the plurality of layers is laminated, and wherein the at least one voltage monitoring device is laminated within plurality of layers of the jumper module. In some embodiments, the at least one voltage monitoring device is a printed circuit board or flex circuit.

In some embodiments, the at least one visible indicator is located on the jumper module. In some embodiments, the at least one voltage monitoring device includes a plurality of voltage monitoring devices, and wherein each of the plurality of voltage monitoring devices is located on a corresponding one of the plurality of photovoltaic modules. In some embodiments, the at least one visible indicator is electrically connected to the rapid shutdown device. In some embodiments, the predetermined voltage level is 0.1 volt to 30 volts.

In some embodiments, the at least one visible indicator displays a first color when the electrical voltage has a first value, and wherein the at least one visible indicator displays a second color different from the first color when the electrical voltage has a second value, wherein the second value is different from the first value. In some embodiments, the at least one visible indicator displays a first flashing code when the electrical voltage has a first value, and wherein the at least one visible indicator displays a second flashing code different from the first flashing code when the electrical voltage has a second value, wherein the second value is different from the first value.

In some embodiments, a method comprises the steps of: monitoring an electrical voltage of a photovoltaic system, wherein the photovoltaic system includes a plurality of photovoltaic modules installed on a roof deck, wherein the photovoltaic modules are arranged in an array on the roof deck, wherein each of the photovoltaic modules includes a first end and a second end opposite the first end, at least one solar cell, and at least one electrical component, a rapid shutdown device, wherein the rapid shutdown device is electrically connected to the at least one electrical component, and at least one visible indicator, wherein the at least one visible indicator is electrically connected to the plurality of photovoltaic modules; activating the rapid shutdown device to reduce the electrical voltage of the photovoltaic system to a predetermined voltage level; and activating the at least one visible indicator when the electrical voltage of the photovoltaic system is less than or equal to the predetermined voltage level.

BRIEF DESCRIPTION OF THE DRAWINGS

FIGS. 1A and 1B are top plan views of some embodiments of a photovoltaic module;

FIG. 4 is a top perspective view of some embodiments of a jumper module for a photovoltaic system;

FIG. 5 is a top plan view of the jumper module shown in FIG. 4;

FIG. 6 is a side elevational view of the jumper module shown in FIG. 4;

FIG. 7 is a bottom plan view of the jumper module shown in FIG. 4;

FIGS. 16A through 17 are top perspective views of a transition box employed by the photovoltaic system shown in FIG. 11;

DETAILED DESCRIPTION

Figure 2:
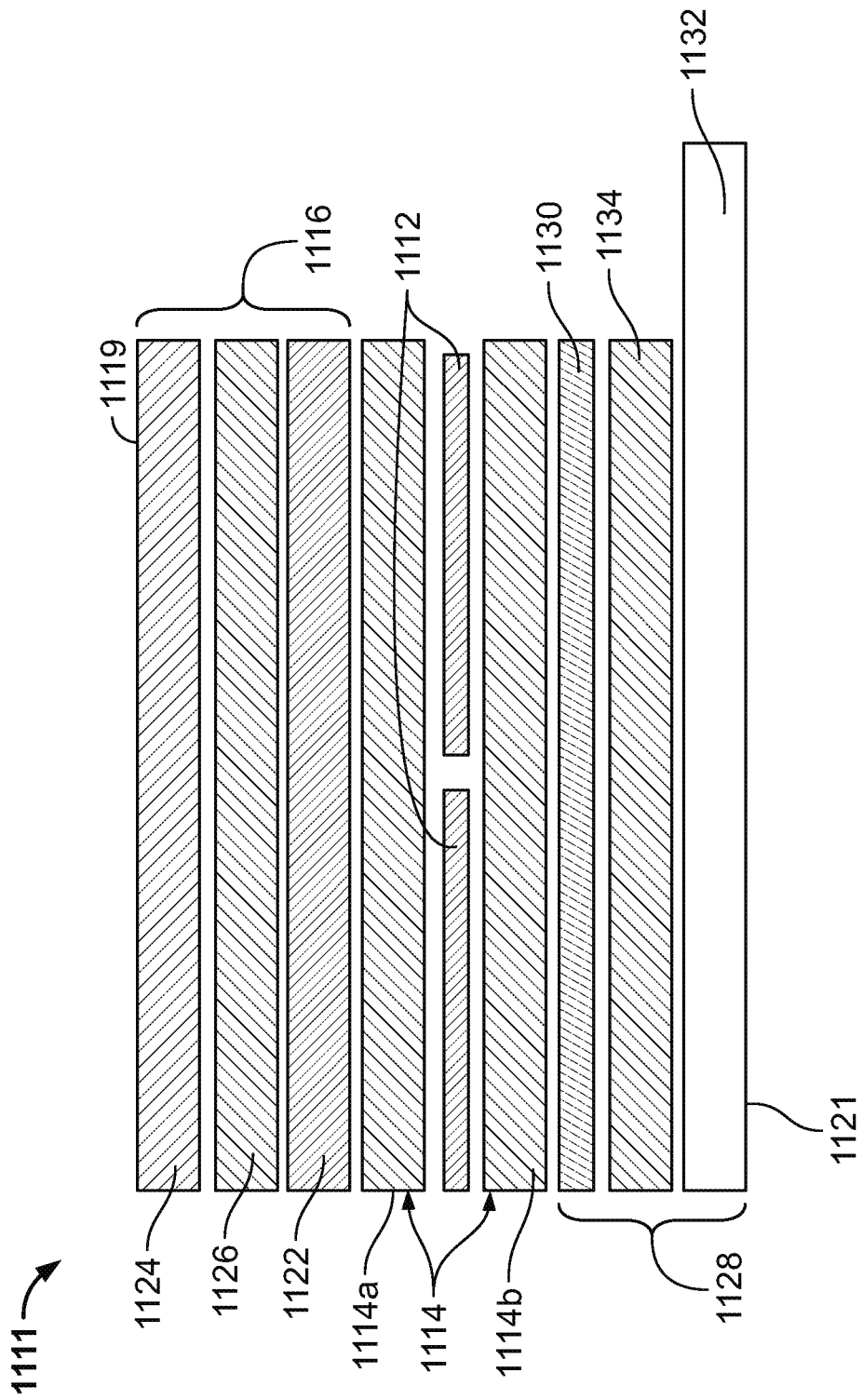
FIGS. 2 and 3 are schematic view of some embodiments of a photovoltaic module.

Referring to FIGS. 1A and 1B, in some embodiments, a photovoltaic module 1110 includes an active area 1109 having a plurality of solar cells 1112. In some embodiments, the photovoltaic module 1110 includes an inactive area comprising a head lap portion 1113, a first side lap 1115 located at one end of the photovoltaic module 1110, and a second side lap 1117 located at an opposite end of the photovoltaic module 1110. In some embodiments, the head lap portion 1113 is textured. In some embodiments, the texture of the head lap portion 1113 is different from a texture of the active area 1109. In some embodiments, a wire cover bracket 1300 is attached to the first side lap 1115. In some embodiments, the wire cover bracket 1300 includes a junction box 1423.

In some embodiments, the plurality of solar cells 1112 includes a first set of solar cells 1112*a* and a second set of solar cells 1112*b*. In some embodiments, the first set of solar cells 1112*a* includes eight of the solar cells 1112. In some embodiments, the second set of solar cells 1112*b* includes eight of the solar cells 1112. In some embodiments, each of the first set of solar cells 1112*a* and the second set of solar cells 1112*b* includes more or less than eight of the solar cells 1112. In some embodiments, a last one of the solar cells 1112 of the first set of solar cells 1112*a* is separated from a first one of the solar cells 1112 of the second set of solar cells 1112*b* by a space S. In some embodiments, the space S is located approximately half the length of the photovoltaic module 1110. In some embodiments, the solar cells 1112 of each of the first and second sets of solar cells 1112*a*, 1112*b* are strung together with bussing 1101. In some embodiments, the bussing 1101 includes nine bussing wires. In some embodiments, the bussing 1101 may include more or less than the nine bussing wires.

In some embodiments, a first bussing wire 1103*a* extends from the first side lap 1115 to the space S. In some embodiments, the first bussing wire 1103*a* extends to approximately half the length of the photovoltaic module 1110. In some embodiments, one end of the first bussing wire 1103*a* is electrically connected to the junction box 1423 and the other end of the first bussing wire 1103*a* is electrically connected to the first set of solar cells 1112*a*. In some embodiments, a second bussing wire 1103*b* extends from the first side lap 1115 to a location proximate to the second side lap 1117. In some embodiments, the second bussing wire 1103*b* extends substantially the entire length of the photovoltaic module 1110. In some embodiments, one end of the second bussing wire 1103*b* is electrically connected to the junction box 1423 and the other end of the second bussing wire 1103*b* is electrically connected to the second set of solar cells 1112*b*. In some embodiments, each of the first bussing wire 1103*a* and the second bussing wire 1103*b* is covered with a polymer layer. In some embodiments, each of the first bussing wire 1103*a* and the second bussing wire 1103*b* is covered with an insulating film. In some embodiments, the insulating film is composed of EPE. In some embodiments, the EPE is comprised of a black strip. In some embodiments, each of the first bussing wire 1103*a* and the second bussing wire 1103*b* is coated with a colorant or dye to reduce reflectivity.

In some embodiments, the photovoltaic module 1110 includes at least one bypass diode 1123. In some embodiments, the at least one bypass diode 1123 is electrically connected to the bussing 1101. In some embodiments, the at least one bypass diode 1123 includes a plurality of bypass diodes 1123. In some embodiments, the at least one bypass diode 1123 is located within a section of the photovoltaic module 1110 that is located between an upper edge of the photovoltaic module 1110 and the plurality of solar cells 1112.

In some embodiments, the plurality of solar cells 1112 includes a plurality of the solar cells 1112. In some embodiments, the plurality of solar cells 1112 is arranged in one row (i.e., one reveal). In some embodiments, the plurality of solar cells 1112 is arranged in two rows (i.e., two reveals). In some embodiments, the plurality of solar cells 1112 is arranged in three rows (i.e., three reveals). In some embodiments, the plurality of solar cells 1112 is arranged in four rows (i.e., four reveals). In some embodiments, the plurality of solar cells 1112 is arranged in five rows (i.e., five reveals). In some embodiments, the plurality of solar cells 1112 is arranged in six rows (i.e., six reveals). In some embodiments, the plurality of solar cells 1112 is arranged in more than six rows.

Referring to FIG. 2, in some embodiments, the active area 1109 of the photovoltaic module 1110 includes the plurality of solar cells 1112, an encapsulant 1114 encapsulating the plurality of solar cells 1112, and a frontsheet 1116 juxtaposed with the encapsulant 1114. In some embodiments, the frontsheet 1116 is juxtaposed with a first surface of the encapsulant 1114. As used herein, the terms "encapsulating" and "encapsulates" mean to partially or fully envelope or enclose, and with respect to certain embodiments of the photovoltaic module 1110, the plurality of solar cells 1112 is fully enveloped by or enclosed within the encapsulant 1114, or partially enveloped by or enclosed within the encapsulant 1114. In some embodiments, the plurality of solar cells 1112 includes a plurality of the solar cells 1112. In some embodiments, the encapsulant 1114 encapsulates 50% to 99.9% of an exterior surface area of the plurality of solar cells 1112.

In some embodiments, the encapsulant 1114 has a thickness of 0.5 mm to 4 mm. In some embodiments, the encapsulant 1114 includes a first layer 1114a and a second layer 1114b. In some embodiments, the first layer 1114a of the encapsulant 1114 initially comprises two layers prior to lamination thereof. In some embodiments, a first layer 1114a of the encapsulant 1114 has a thickness of 0.2 mm to 2 mm. In some embodiments, a second layer 1114b of the encapsulant 1114 has a thickness of 0.2 mm to 2 mm. In some embodiments, the thickness of the first layer 1114a is equal to the thickness of the second layer 1114b. In some embodiments, the thickness of the first layer 1114a is different from the thickness of the second layer 1114b. In some embodiments, the first layer 1114a of the encapsulant 1114 has a thickness that is sufficient to prevent or reduce leakage current to an amount that will not provide a risk of electrocution to a user by touch in the event the glass layer 1122 breaks or shatters. In some embodiments, such thickness of the first layer 1114a of the encapsulant 1114 is described above. In some embodiments, the first layer 1114a of the encapsulant 1114 has a thickness that is sufficient to prevent or reduce leakage current to an amount that will not provide a risk of electrocution to a user by touch when the photovoltaic module 1110 is wet, in the event the glass layer 1122 breaks or shatters. In some embodiments, such thickness of the first layer 1114a of the encapsulant 1114 is described above.

In some embodiments, the photovoltaic module 1110 withstands walking loads/step resistance that conforms to standards under UL 3741 test standards (UL Standard for Safety Photovoltaic Hazard Control). In some embodiments, the photovoltaic module 1110 includes an axe impact resistance that conforms to standards under UL 3741 test standards. In some embodiments, the photovoltaic module 1110 includes a body fall resistance that conforms to standards under UL 3741 test standards. In some embodiments, a wet leakage current test performed in accordance with UL 3741 results in a leakage current of less than 130 nA.

In some embodiments, the photovoltaic module 1110 includes an impact resistance that conforms to standards under UL 1703 test standards. The UL 1703 test involves attaching the photovoltaic module 1110 to a representative model of a roof and dropping a 2-inch diameter steel ball onto the photovoltaic module 1110 from 1.3 meters. A photovoltaic module is deemed to pass the UL 1703 standard if there are no exposed electrical components and no large pieces of glass are ejected.

In some embodiments, the encapsulant 1114 may be composed of polyolefins, ethyl vinyl acetates, ionomers, silicones, poly vinyl butyral, epoxies, polyurethanes, or combinations/hybrids thereof. In some embodiments, the encapsulant 1114 is composed of thermosetting polyolefin.

In some embodiments, the photovoltaic module 1110 includes a first surface 1119 and a second surface 1121 opposite the first surface 1119. In some embodiments, the first surface 1119 is an upper, sun facing-side surface of the photovoltaic module 1110, and the second surface 1121 is a lower surface configured to face a roof deck on which the photovoltaic module 1110 is installed.

In some embodiments, the frontsheet 1116 includes a glass layer 1122 and a polymer layer 1124 attached to a first surface of the glass layer 1122. In some embodiments, the frontsheet 1116 is juxtaposed with the first layer 1114a of the encapsulant 1114. In some embodiments, each of the encapsulant 1114, the glass layer 1122, and the polymer layer 1124 is transparent. In some embodiments, the polymer layer 1124 is attached to the glass layer 1122 by a first adhesive layer 1126. In some embodiments, the first adhesive layer 1126 may include polyvinyl butyrate, acrylic, silicone, or polycarbonate. In some embodiments, the first adhesive layer 1126 may include pressure sensitive adhesives. In some embodiments, the polymer layer 1124 is attached to the glass layer 1122 by thermal bonding. In some embodiments, the frontsheet 1116 includes at least one of the glass layer 1122 or the polymer layer 1124. In some embodiments, the first adhesive layer 1126 is transparent. As used herein, the term "transparent" means having a solar weighted transmittance of 80% or greater, and with respect to certain embodiments of the photovoltaic module 1110, a transparent layer of the photovoltaic module has a solar weighted transmittance of 80% or greater. In some embodiments, the frontsheet 1116 does not include the glass layer 1122. In some embodiments, the polymer layer 1124 is textured. In some embodiments, the glass layer 1122 has a thickness of 1 mm to 6 mm.

In some embodiments, the first adhesive layer 1126 is composed of thermosetting polyolefin, thermosetting polyolefin encapsulant material, thermosetting ethylene-vinyl acetate (EVA), EVA encapsulants, thermoplastic olefin, thermoplastic polyolefin (TPO) or hybrids/combinations thereof. In some embodiments, the first adhesive layer 1126 has a thickness of 0.2 mm to 2 mm. In some embodiments, the first adhesive layer 1126 has a thickness of 1 μm to 900 μm.

In some embodiments, the polymer layer 1124 is composed of a fluoropolymer. In certain embodiments, the fluoropolymer may be ethylene tetrafluoroethylene (ETFE), fluoropolymer is polyvinylidene fluoride (PVDF), tetrafluoroethylene-hexafluoropropylene copolymers (FEP), and tetrafluoroethylene-hexafluoropropylene-vinylidene fluoride copolymers (THV), polyvinyl fluoride (PVF), or blends thereof. In some embodiments, the frontsheet is composed of fluoropolymers, acrylics, polyesters, silicones, polycarbonates, or combinations thereof. In some embodiments, the polymer layer 1124 is composed of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyphenylsulfone (PPSU), polyolefin, cyclic olefin copolymers (CPCs), or polyimide. In some embodiments, the polymer layer 1124 is composed of a crosslinked polymeric material. In some embodiments, 50% to 99% of the polymer chains of the polymeric material are crosslinked. In some embodiments, the polymer layer 1124 has a thickness of 0.01 mm to 0.5 mm.

In some embodiments, a backsheet 1128 is juxtaposed with a second layer 1114b of the encapsulant 1114. In some embodiments, the backsheet 1128 includes a first layer 1130 and a second layer 1132. In some embodiments, the first layer 1130 is juxtaposed with the second layer 1114b of the encapsulant 1114. In some embodiments, the second layer 1132 is juxtaposed with the first layer 1130. In some embodiments, the first layer 1130 of the backsheet 1128 is composed of a polymeric material. In some embodiments, the first layer 1130 of the backsheet 1128 is composed of polyethylene terephthalate ("PET"). In some embodiments, the first layer 1130 of the backsheet 1128 is composed of ethylene tetrafluoroethylene ("ETFE"). In some embodiments, the first layer 1130 of the backsheet 1128 is composed of an acrylic such as polymethyl methacrylate ("PMMA"). In some embodiments, the first layer 1130 of the backsheet 1128 is composed of thermoplastic polyolefin (TPO). In some embodiments, the first layer 1130 of the backsheet 1128 includes of a single ply TPO roofing membrane. In some embodiments, non-limiting examples of TPO membranes are disclosed in U.S. Pat. No. 9,359,014 to Yang et al., which is incorporated by reference herein in its entirety. In some embodiments, the first layer 1130 of the backsheet 1128 is composed of polyvinyl chloride. In some embodiments, the first layer 1130 of the backsheet 1128 is composed of ethylene propylene diene monomer (EPDM) rubber. In some embodiments, the first layer 1130 of the backsheet 1128 includes a flame retardant additive. In some embodiments, the flame retardant additive may be clays, nanoclays, silicas, carbon black, metal hydroxides such as aluminum hydroxide, metal foils, graphite, and combinations thereof. In some embodiments, the first layer 1130 has a thickness of 0.2 mm to 0.5 mm.

In some embodiments, the second layer 1132 of the backsheet 1128 is composed of a polymeric material. In some embodiments, the second layer 1132 of the backsheet 1128 is composed of thermoplastic polyolefin (TPO). In some embodiments, the second layer 1132 of the backsheet 1128 includes a single ply TPO roofing membrane. In some embodiments, non-limiting examples of TPO membranes are disclosed in U.S. Pat. No. 9,359,014 to Yang et al., which is incorporated by reference herein in its entirety. In some embodiments, the second layer 1132 of the backsheet 1128 is composed of polyethylene terephthalate ("PET"). In some embodiments, the second layer 1132 is composed of styrene acrylic copolymer. In some embodiments, the second layer 1132 of the backsheet 1128 is composed of ethylene tetrafluoroethylene ("ETFE"). In some embodiments, the second layer 1132 of the backsheet 1128 is composed of an acrylic such as polymethyl methacrylate ("PMMA"). In some embodiments, the second layer 1132 of the backsheet 1128 is composed of polyvinyl chloride. In some embodiments, the second layer 1132 of the backsheet 1128 is composed of ethylene propylene diene monomer (EPDM) rubber. In some embodiments, the second layer 1132 of the backsheet 1128 includes a flame retardant additive. In some embodiments, the flame retardant additive may be clays, nanoclays, silicas, carbon black, metal hydroxides such as aluminum hydroxide, metal foils, graphite, and combinations thereof.

Figure 3:
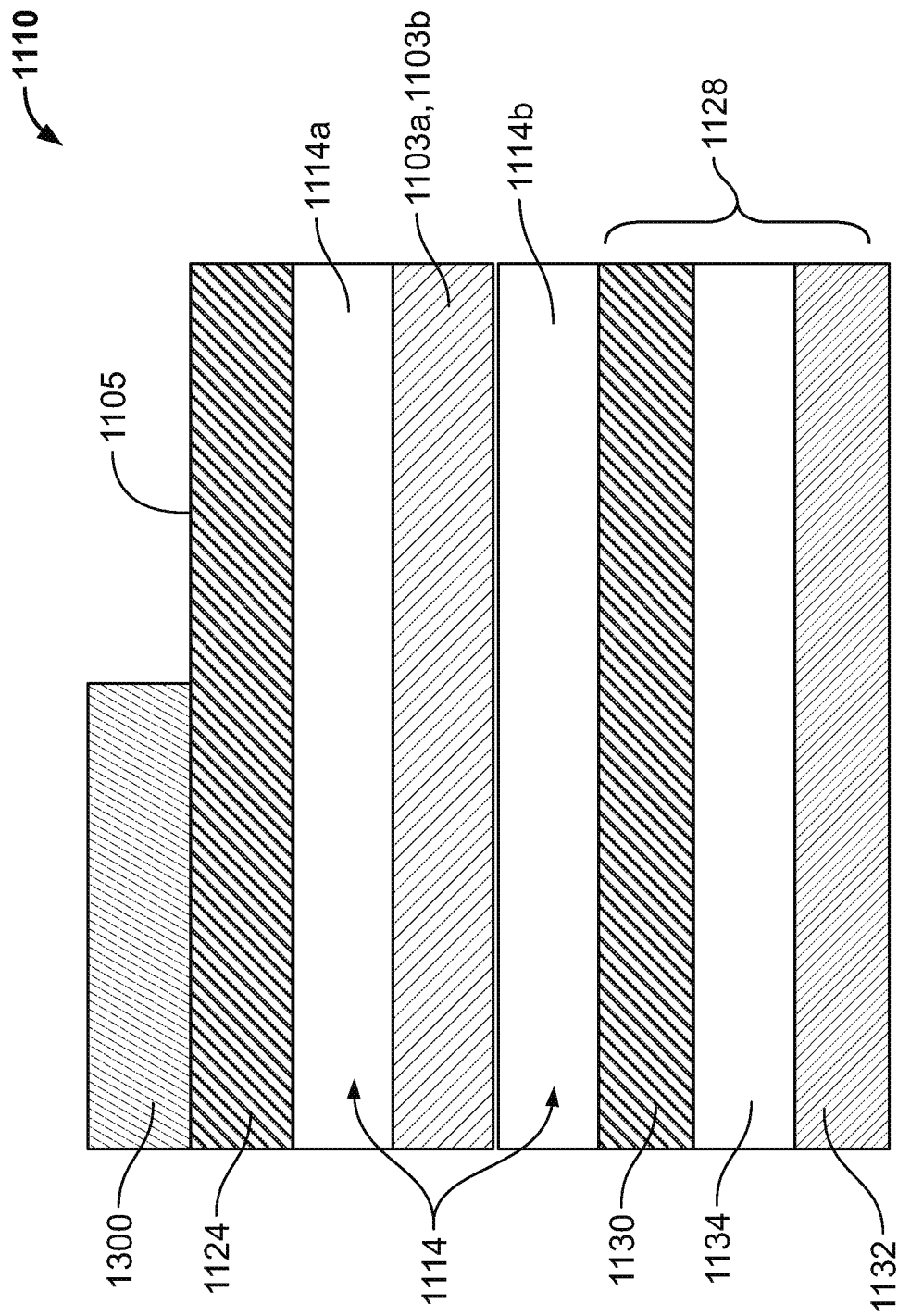

FIG. 3 shows a schematic view of the first side lap 1115. In some embodiments, the first side lap 1115 includes a structure and materials similar to those of the active area 1109, with certain differences. In some embodiments, the first side lap 1115 includes ends of the bussing wires 1103*a*, 1103*b* encapsulated by the encapsulant 1114. In some embodiments, the first side lap 1115 includes the polymer layer 1124. In some embodiments, the polymer layer 1124 is an upper, sun facing-side surface of the first side lap 1115. In some embodiments, the second side lap 1117 includes a structure and materials similar to those as the first side lap 1115. In some embodiments, the head lap portion 1113 includes a structure and materials similar to those as the first side lap 1115.

In some embodiments, the wire cover bracket 1300 is located on a surface 1105 of the polymer layer 1124. In some embodiments, the wire cover bracket 1300 is composed of a polymer. In some embodiments, the wire cover bracket 1300 is composed of a composite material. In some embodiments, the wire cover bracket 1300 is composed of a reinforced plastic. In some embodiments, the wire cover bracket 1300 is composed of a fiber-reinforced polymer. In some embodiments, the wire cover bracket 1300 is composed of fiberglass. In some embodiments, the wire cover bracket 1300 is injection molded. In some embodiments, the wire cover bracket 1300 is configured to receive a cover 1304, which shall be described in detail hereinafter. In some embodiments, the wire cover bracket 1300 is attached to the surface 1105 of the polymer layer 1124 by an adhesive. In some embodiments, the wire cover bracket 1300 is attached to the surface 1105 of the polymer layer 1124 by thermal bonding. In some embodiments, the wire cover bracket 1300 is attached to the surface 1105 of the polymer layer 1124 by ultrasonic welding. In some embodiments, the wire cover bracket 1300 has a height of 1 mm to 10 mm.

In some embodiments, the first layer 1130 is attached to the second layer 1132 by a second adhesive layer 1134. In some embodiments, the second adhesive layer 1134 may include polyvinyl butyrate, acrylic, silicone, or polycarbonate. In some embodiments, the second adhesive layer 1134 may include pressure sensitive adhesives. In some embodiments, the second adhesive layer 1134 is composed of thermosetting polyolefin, thermosetting polyolefin encapsulant material, thermosetting ethylene-vinyl acetate (EVA), EVA encapsulants, thermoplastic olefin, thermoplastic polyolefin (TPO) or hybrids/combinations thereof. In some embodiments, the second adhesive layer 1134 has a thickness of 0.2 mm to 2 mm. In some embodiments, the second adhesive layer 1134 has a thickness of 1 μm to 900 μm.

In some embodiments, the first layer 1130 is attached to the second layer 1132 by thermal bonding. In some embodiments, each of the plurality of photovoltaic modules 1110 is installed on the roof deck by an adhesive. In some embodiments, the adhesive is adhered directly to the roof deck. In some embodiments, the adhesive is adhered to an underlayment. In some embodiments, the underlayment is adhered directly to the roof deck. In some embodiments, the adhesive is located on a rear surface of the photovoltaic module 1110. In some embodiments, the adhesive is located on the second layer 1132 of the backsheet 1128. In some embodiments, the adhesive includes at least one adhesive strip. In some embodiments, the adhesive includes a plurality of adhesive strips. In some embodiments, the plurality of adhesive strips is arranged intermittently. In some embodiments, the adhesive is located proximate to one edge of the photovoltaic module 1110. In some embodiments, the adhesive is a peel and stick film sheet. In some embodiments, the peel and stick film sheet includes at least one sheet of film removably attached to the rear surface. In some embodiments, the peel and stick film sheet is composed of EverGuard Freedom HW peel and stick membrane manufactured by GAF. In some embodiments, the adhesive includes polyvinyl butyrate, acrylic, silicone, or polycarbonate. In some embodiments, the adhesive includes pressure sensitive adhesives.

Referring to FIGS. 4 through 9, in some embodiments, a jumper module 1210 includes an active portion 1212 having a first end 1214, a second end 1216 opposite the first end 1214, a first edge 1218 extending from the first end 1214 to the second end 1216, and a second edge 1220 opposite the first edge 1218 and extending from the first end 1214 to the second end 1216. In some embodiments, the active portion 1212 includes a first surface 1222 and a second surface 1224 opposite the first surface 1222. In some embodiments, the jumper module 1210 is configured to be installed on a roof deck. In some embodiments, the jumper module 1210 is installed on the roof deck by a plurality of fasteners. In some embodiments, the active portion 1212 includes a first zone 1226 (nail zone) that extends from the first end 1214 to the second end 1216 and from the first edge 1218 to a location intermediate the first edge 1218 and the second edge 1220. In some embodiments, the first zone 1226 is configured to receive the plurality of fasteners. In some embodiments, the plurality of fasteners is installed through the first zone 1226. In some embodiments, the plurality of fasteners includes a plurality of nails. In some embodiments, the plurality of fasteners includes a plurality of rivets. In some embodiments, the plurality of fasteners includes a plurality of staples. In some embodiments, the plurality of fasteners includes a plurality of screws.

In some embodiments, the jumper module 1210 is installed on the roof deck by an adhesive 1228. In some embodiments, the adhesive 1228 is adhered to the head lap portion 1113 of a photovoltaic module 1110 below the jumper module 1210. In some embodiments, the adhesive 1228 is adhered directly to the roof deck. In some embodiments, the adhesive 1228 is adhered to an underlayment. In some embodiments, the underlayment is adhered directly to the roof deck. In some embodiments, the adhesive 1228 includes at least one adhesive strip. In some embodiments, the adhesive 1228 includes a plurality of adhesive strips. In some embodiments, the adhesive 1228 is located on the second surface 1224. In some embodiments, the adhesive 1228 is located proximate to the first edge 1218. In some embodiments, the adhesive 1228 is located intermediate the first edge 1218 and the second edge 1220. In some embodiments, the adhesive 1228 is located proximate to the second edge 1220. In some embodiments, the adhesive 1228 is a peel and stick film sheet. In some embodiments, the peel and stick film sheet includes at least one sheet of film removably attached to the second surface 1224. In some embodiments, the peel and stick film sheet is composed of EverGuard Freedom HW peel and stick membrane manufactured by GAF. In some embodiments, the adhesive 1228 is covered by a release liner. In some embodiments, the release liner includes paper with a silicone coating. In some embodiments, the adhesive 1228 includes polyvinyl butyrate, butyl, acrylic, silicone, or polycarbonate. In some embodiments, the adhesive 1228 includes pressure sensitive adhesives.

Still referring to FIGS. 4 through 9, in some embodiments, the jumper module 1210 includes a first side lap 1230 located the first end 1214. In some embodiments, the jumper module 1210 includes a second side lap 1232 located at the second end 1216. In some embodiments, the first side lap 1230 includes a surface 1234. In some embodiments, the second side lap 1232 includes a surface 1236. In some embodiments, the first side lap 1230 is square in shape. In some embodiments, the first side lap 1230 is rectangular in shape. In some embodiments, the first side lap 1230 includes other suitable shapes and sizes. In some embodiments, the second side lap 1232 is square in shape. In some embodiments, the second side lap 1232 is rectangular in shape. In some embodiments, the second side lap 1232 includes other suitable shapes and sizes. In some embodiments, the first side lap 1230 is integral with the active portion 1212. In some embodiments, the first side lap 1230 is a separate component from the active portion 1212. In some embodiments, the first side lap 1230 is attached to the active portion 1212. In some embodiments, the second side lap 1232 is integral with the active portion 1212. In some embodiments, the second side lap 1232 is a separate component from the active portion 1212. In some embodiments, the second side lap 1232 is attached to the active portion 1212.

In some embodiments, the first side lap 1230 includes a first width W1. In some embodiments, the first width W1 extends from the second edge 1220 to a location intermediate the first edge 1218 and the second edge 1220. In some embodiments, the second side lap 1232 includes a second width W2. In some embodiments, the second width W2 extends from the first edge 1218 to the second edge 1220. In some embodiments, the width W1 of the first side lap 1230 is approximately half the width W2 of the second side lap 1232. In some embodiments, the width W1 of the first side lap 1230 is 70 mm to 120 mm. In some embodiments, the width W2 of the second side lap 1232 is 70 mm to 200 mm.

In some embodiments, the jumper module 1210 includes a first junction box 1238. In some embodiments, the first junction box 1238 is located on the surface 1234 of the first side lap 1230. In some embodiments, the first junction box 1238 is attached to the surface 1234 by an adhesive. In some embodiments, the first junction box 1238 is encapsulated by the first side lap 1230. In some embodiments, the jumper module 1210 includes a second junction box 1240. In some embodiments, the second junction box 1240 is located on the surface 1236 of the second side lap 1232. In some embodiments, the second junction box 1240 is attached to the surface 1236 by an adhesive. In some embodiments, the second junction box 1240 is encapsulated by the second side lap 1232. In certain embodiments, other electronic and electrical components may be attached to the first side lap 1230 and/or the second side lap 1232. In some embodiments, non-limiting examples of such electronic and electrical components include an electrical connector, a rapid shutdown device, an optimizer, and a microinverter. In some embodiments, the electrical connector includes a flat wire connector.

Figure 8:
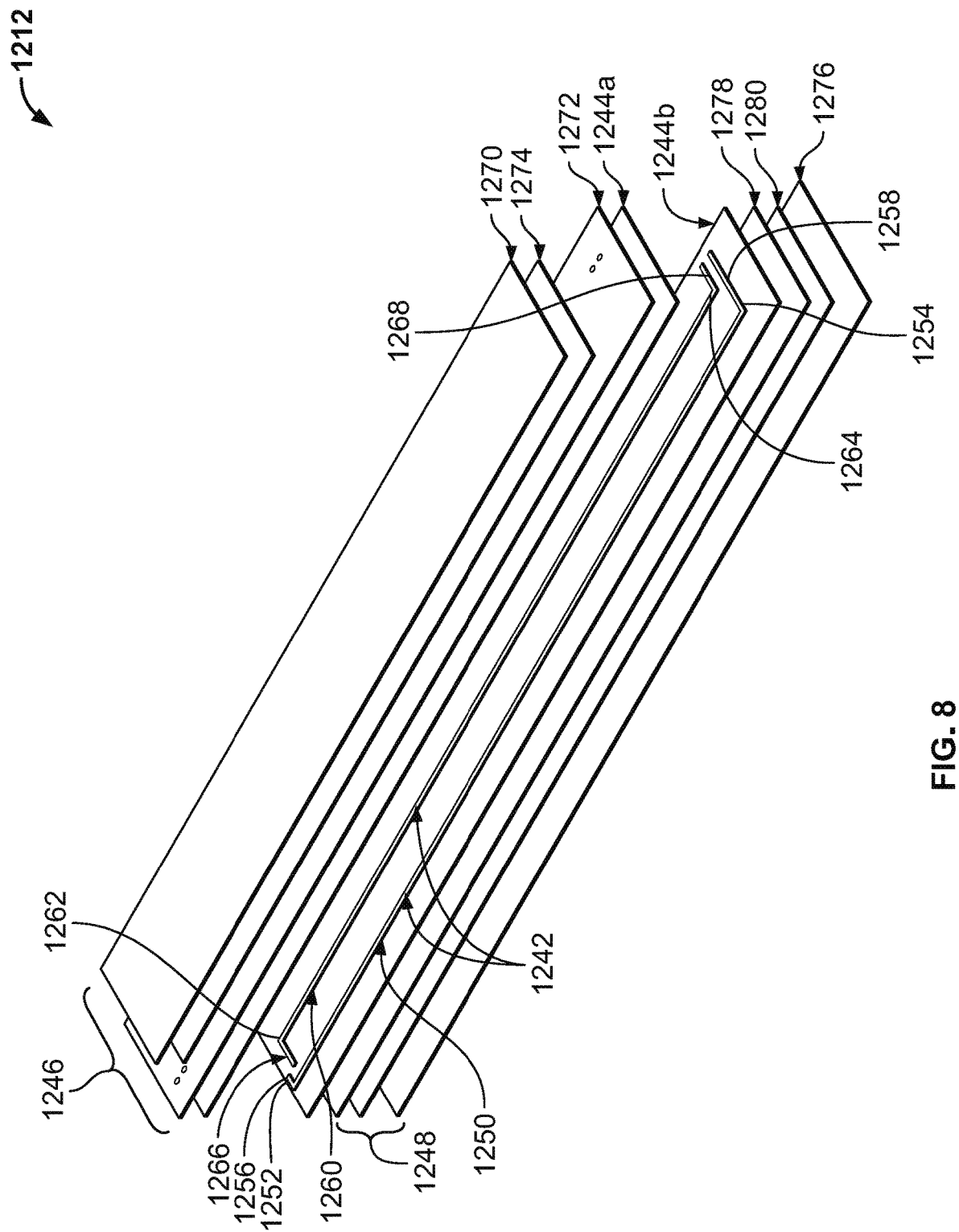
FIG. 8 is an exploded, top perspective view of an active portion of the jumper module shown in FIG. 4.
Figure 9:
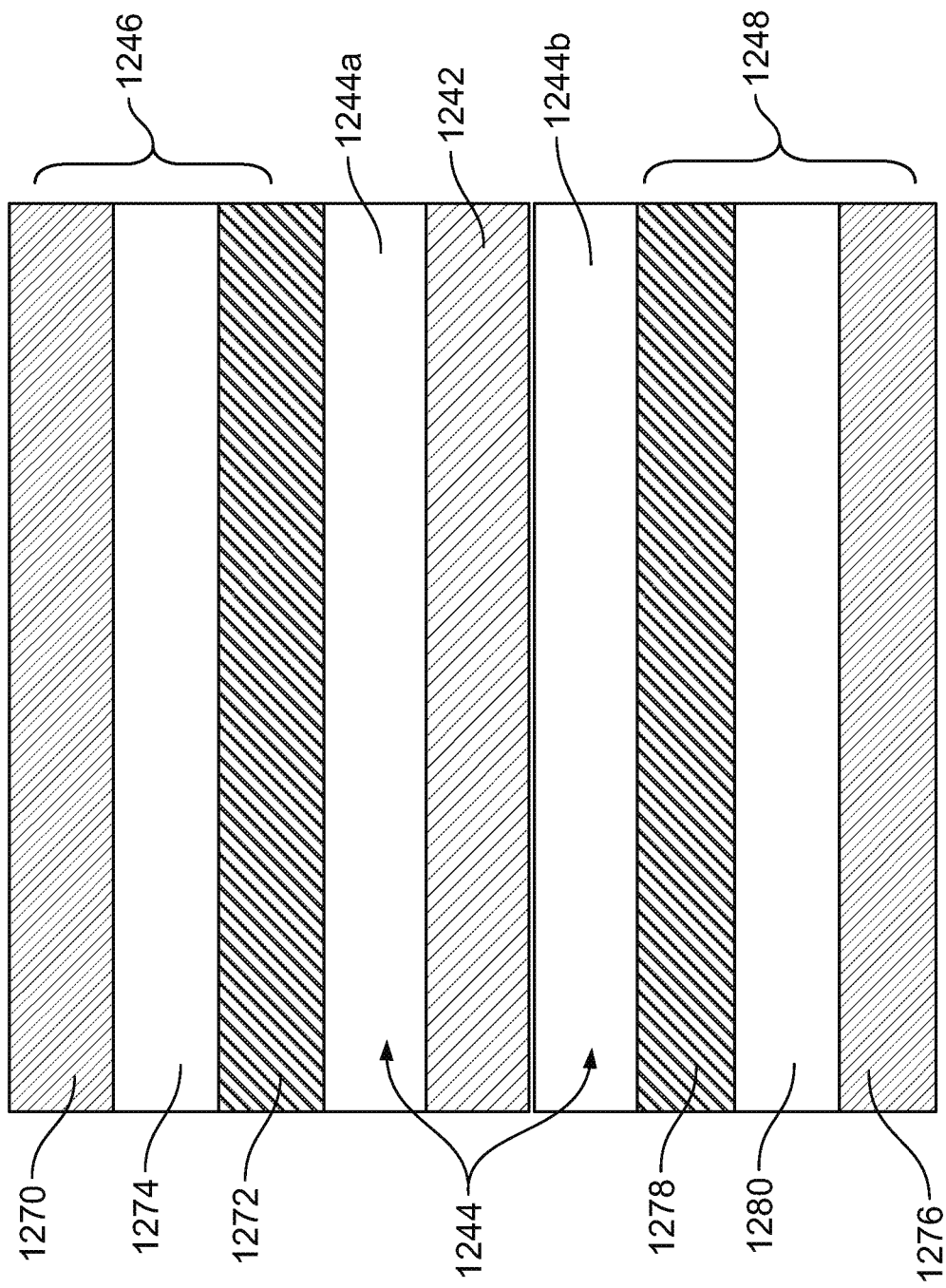
FIG. 9 is schematic view of the active portion of the jumper module shown in FIG. 4.

Referring to FIGS. 8 and 9, in some embodiments, the active portion 1212 is a laminated structure. In some embodiments, the active portion 1212 includes electrical bussing 1242, an encapsulant 1244 encapsulating the electrical bussing 1242, a frontsheet 1246 juxtaposed with the encapsulant 1244, and a backsheet 1248 juxtaposed with the encapsulant 1244. As used herein, the terms "encapsulating" and "encapsulates" mean to partially or fully envelope or enclose, and with respect to certain embodiments of the jumper module 1210, the electrical bussing 1242 is fully enveloped by or enclosed within the encapsulant 1244, or partially enveloped by or enclosed within the encapsulant 1244. In some embodiments, the encapsulant 1244 includes a first layer 1244*a* and a second layer 1244*b*. In some embodiments, the encapsulant 1244 includes a structure and/or materials that is similar to the encapsulant 1114.

In some embodiments, the electrical bussing 1242 includes a first bus ribbon 1250 extending from a first end 1252 proximate to the first end 1214 and a second end 1254 proximate to the second end 1216. In some embodiments, the first bus ribbon 1250 includes a first terminal 1256 located at the first end 1252 and a second terminal 1258 located at the second end 1254. In some embodiments, the first terminal 1256 is a positive terminal, while the second terminal 1258 is a negative terminal. In some embodiments, the first terminal 1256 is a negative terminal, while the second terminal 1258 is a positive terminal.

In some embodiments, the electrical bussing 1242 includes a second bus ribbon 1260 extending from a first end 1262 proximate to the first end 1214 and a second end 1264 proximate to the second end 1216. In some embodiments, the second bus ribbon 1260 includes a first terminal 1266 located at the first end 1262 and a second terminal 1268 located at the second end 1264. In some embodiments, the first terminal 1266 is a negative terminal, while the second terminal 1268 is a positive terminal. In some embodiments, the first terminal 1266 is a positive terminal, while the second terminal 1268 is a negative terminal.

In some embodiments, the encapsulant 1244 may be composed of polyolefins, ethyl vinyl acetates, ionomers, silicones, poly vinyl butyral, epoxies, polyurethanes, or combinations/hybrids thereof. In some embodiments, the encapsulant 1244 is composed of thermosetting polyolefin.

In some embodiments, the encapsulant 1244 has a thickness of 0.4 mm to 1.8 mm. In some embodiments, the encapsulant 1244 has a thickness similar to those of the encapsulant 1114 of the photovoltaic module 1110 described above. In some embodiments, the first layer 1244a of the encapsulant 1244 has a thickness of 0.2 mm to 0.9 mm. In some embodiments, the first layer 1244a of the encapsulant 1244 has a thickness similar to those of the first layer 1114a of the encapsulant 1114 described above. In some embodiments, the second layer 1244b of the encapsulant 1244 has a thickness of 0.2 mm to 0.9 mm. In some embodiments, the second layer 1244b of the encapsulant 1244 has a thickness similar to those of the second layer 1114b of the encapsulant 1114 described above. In some embodiments, the thickness of the first layer 1244a is equal to the thickness of the second layer 1244b. In some embodiments, the thickness of the first layer 1244a is different from the thickness of the second layer 1244b.

In some embodiments, the first layer 1244a is white in color. In some embodiments, the second layer 1244b is white in color.

In some embodiments, the frontsheet 1246 includes an upper layer 1270 and a polymer layer 1272 attached to the upper layer 1270. In some embodiments, the frontsheet 1246 is juxtaposed with the first layer 1244a of the encapsulant 1244. In some embodiments, the polymer layer 1272 is attached to the upper layer 1270 by an adhesive layer 1274. In some embodiments, the adhesive layer 1274 may include polyvinyl butyrate, acrylic, silicone, or polycarbonate. In some embodiments, the adhesive layer 1274 may include pressure sensitive adhesives. In some embodiments, the polymer layer 1272 is attached to the upper layer 1270 by thermal bonding. In some embodiments, the frontsheet 1246 includes at least one of the upper layer 1270 or the polymer layer 1272. In some embodiments, the upper layer 1270 is an upper, sun facing-side surface of the jumper module 1210.

In some embodiments, the upper layer 1270 is composed of thermoplastic polyolefin (TPO). In some embodiments, the upper layer 1270 includes a single ply TPO roofing membrane. In some embodiments, the upper layer 1270 is colored black. In some embodiments, non-limiting examples of TPO membranes are disclosed in U.S. Pat. No. 9,359,014 to Yang et al., which is incorporated by reference herein in its entirety.

In some embodiments, the upper layer 1270 is composed of polyvinyl chloride (PVC). In some embodiments, the upper layer 1270 is composed of ethylene propylene diene monomer (EPDM) rubber. In some embodiments, the upper layer 1270 includes a flame retardant additive. In some embodiments, the flame retardant additive may be clays, nanoclays, silicas, carbon black, metal hydroxides such as aluminum hydroxide, metal foils, graphite, and combinations thereof. In some embodiments, the upper layer 1270 is white in color. In some embodiments, the upper layer 1270 has a thickness of 2.5 mm to 4 mm.

In some embodiments, the adhesive layer 1274 is composed of thermosetting polyolefin, thermosetting polyolefin encapsulant material, thermosetting ethylene-vinyl acetate (EVA), EVA encapsulants, thermoplastic olefin, thermoplastic polyolefin (TPO) or hybrids/combinations thereof. In some embodiments, the adhesive layer 1274 is white in color.

In some embodiments, the adhesive layer 1274 has a thickness of 1 µm to 900 µm. In some embodiments, the adhesive layer 1274 has a thickness similar to those of the first adhesive layer 1126 of the photovoltaic module 1110 described above. In some embodiments, the adhesive layer 1274 has a structure and/or is composed of materials similar to the first adhesive layer 1126.

In some embodiments, the frontsheet 1246 does not include the upper layer 1270 or the adhesive layer 1274.

In some embodiments, the polymer layer 1272 is composed of a fluoropolymer. In certain embodiments, the fluoropolymer may be ethylene tetrafluoroethylene (ETFE), fluoropolymer is polyvinylidene fluoride (PVDF), tetrafluoroethylene-hexafluoropropylene copolymers (FEP), and tetrafluoroethylene-hexafluoropropylene-vinylidene fluoride copolymers (THV), polyvinyl fluoride (PVF), or blends thereof. In some embodiments, the frontsheet is composed of fluoropolymers, acrylics, polyesters, silicones, polycarbonates, or combinations thereof. In some embodiments, the polymer layer 1272 is composed of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyphenylsulfone (PPSU), polyolefin, cyclic olefin copolymers (CPCs), or polyimide. In some embodiments, the polymer layer 1272 is composed of a crosslinked polymeric material. In some embodiments, 50% to 99% of the polymer chains of the polymeric material are crosslinked. In some embodiments, the polymer layer 1272 is white in color. In some embodiments, the polymer layer 1272 has a thickness of 0.01 mm to 0.5 mm.

In some embodiments, the backsheet 1248 includes a lower layer 1276. In some embodiments, the backsheet 1248 includes a polymer layer 1278. In some embodiments, the lower layer 1276 and the polymer layer 1278 are attached to one another by an adhesive layer 1280. In some embodiments, the adhesive layer 1280 may include polyvinyl butyrate, acrylic, silicone, or polycarbonate. In some embodiments, the adhesive layer 1280 may include pressure sensitive adhesives. In some embodiments, the adhesive layer 1280 is composed of thermosetting polyolefin, thermosetting polyolefin encapsulant material, thermosetting ethylene-vinyl acetate (EVA), EVA encapsulants, thermoplastic olefin, thermoplastic polyolefin (TPO) or hybrids/combinations thereof. In some embodiments, the adhesive layer 1280 is white in color. In some embodiments, the lower layer 1276 is attached to the polymer layer 1278 by thermal bonding. In some embodiments, the backsheet 1248 includes at least one of the lower layer 1276 or the polymer layer 1278. In some embodiments, the lower layer 1276 is a lower surface of the jumper module 1210 configured to face a roof deck on which the jumper module 1210 is installed.

In some embodiments, the lower layer 1276 is composed of thermoplastic polyolefin (TPO). In some embodiments, the lower layer 1276 includes a single ply TPO roofing membrane. In some embodiments, the lower layer 1276 is colored black. In some embodiments, non-limiting examples of TPO membranes are disclosed in U.S. Pat. No. 9,359,014 to Yang et al., which is incorporated by reference herein in its entirety.

In some embodiments, the lower layer 1276 is composed of polyvinyl chloride. In some embodiments, the lower layer 1276 is composed of ethylene propylene diene monomer (EPDM) rubber. In some embodiments, the lower layer 1276 includes a flame retardant additive. In some embodiments, the flame retardant additive may be clays, nanoclays, silicas, carbon black, metal hydroxides such as aluminum hydroxide, metal foils, graphite, and combinations thereof. In some embodiments, the lower layer 1276 is white in color. In some embodiments, the lower layer 1276 has a thickness of 2.5 mm to 4 mm.

In some embodiments, the backsheet 1248 does not include the lower layer 1276 or the adhesive layer 1280. In some embodiments, the frontsheet 1246 does not include the upper layer 1270 or the adhesive layer 1274 and the backsheet 1248 does not include the lower layer 1276 or the adhesive layer 1280.

In some embodiments, the polymer layer 1278 is composed of a fluoropolymer. In certain embodiments, the fluoropolymer may be ethylene tetrafluoroethylene (ETFE), fluoropolymer is polyvinylidene fluoride (PVDF), tetrafluoroethylene-hexafluoropropylene copolymers (FEP), and tetrafluoroethylene-hexafluoropropylene-vinylidene fluoride copolymers (THV), polyvinyl fluoride (PVF), or blends thereof. In some embodiments, the frontsheet is composed of fluoropolymers, acrylics, polyesters, silicones, polycarbonates, or combinations thereof. In some embodiments, the polymer layer 1278 is composed of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyphenylsulfone (PPSU), polyolefin, cyclic olefin copolymers (CPCs), or polyimide. In some embodiments, the polymer layer 1278 is composed of a crosslinked polymeric material. In some embodiments, 50% to 99% of the polymer chains of the polymeric material are crosslinked. In some embodiments, the polymer layer 1278 is white in color. In some embodiments, the polymer layer 1278 has a thickness of 0.01 mm to 0.5 mm. In some embodiments, the adhesive layer 1280 has a thickness of 1 μm to 900 μm. In some embodiments, the jumper module 1210 has a thickness of 1 mm to 10 mm.

In some embodiments, the jumper module 1210 is moisture resistant. As used herein, the term "moisture resistant" means having a water transmission rate of less than or equal to 0.05 U.S. perms, as measured by ASTM E 96, Procedure B—Standard Test Methods for Water Vapor Transmission of Materials. In some embodiments, the jumper module 1210 withstands walking loads/step resistance that conforms to standards under UL 3741 test standards (UL Standard for Safety Photovoltaic Hazard Control). In some embodiments, the jumper module 1210 includes an axe impact resistance that conforms to standards under UL 3741 test standards. In some embodiments, the jumper module 1210 includes a body fall resistance that conforms to standards under UL 3741 test standards.

Figure 10:
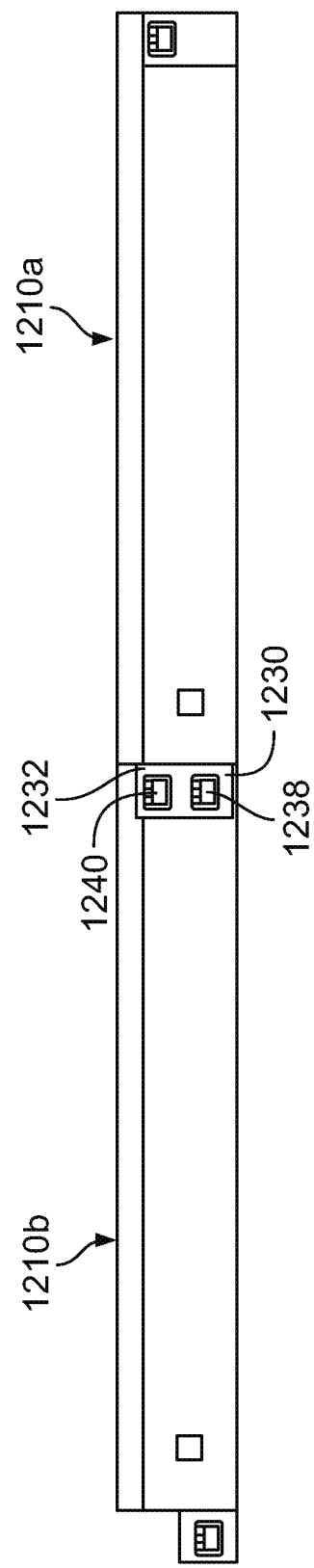
FIG. 10 is a top plan view of a jumper module shown in FIG. 4 overlaying another one of the jumper module.

Referring to FIG. 10, in some embodiments, one of the jumper module 1210*a* is configured to overlay another one of the jumper module 1210*b*. In some embodiments, the first side lap 1230 of the jumper module 1210*a* overlays the second side lap 1232 of the jumper module 1210*b*. In some embodiments, the first side lap 1230 of the jumper module 1210*a* is attached to the second side lap 1232 of the jumper module 1210*b*. In some embodiments, the first side lap 1230 of the jumper module 1210*a* is attached to the second side lap 1232 of the jumper module 1210*b* by an adhesive. In some embodiments, the first side lap 1230 of the jumper module 1210*a* is attached to the second side lap 1232 of the jumper module 1210*b* by thermal bonding. In some embodiments, the first side lap 1230 of the jumper module 1210*a* is attached to the second side lap 1232 of the jumper module 1210*b* by ultrasonic welding. In some embodiments, the first side lap 1230 of the jumper module 1210*a* is attached to the second side lap 1232 of the jumper module 1210*b* by at least one fastener. In some embodiments, the first junction box 1238 of the jumper module 1210*a* is positioned proximate to the second junction box 1240 of the jumper module 1210*b*. In some embodiments, the first junction box 1238 and the second junction box 1240 are arranged in a linear array.

Figure 11:
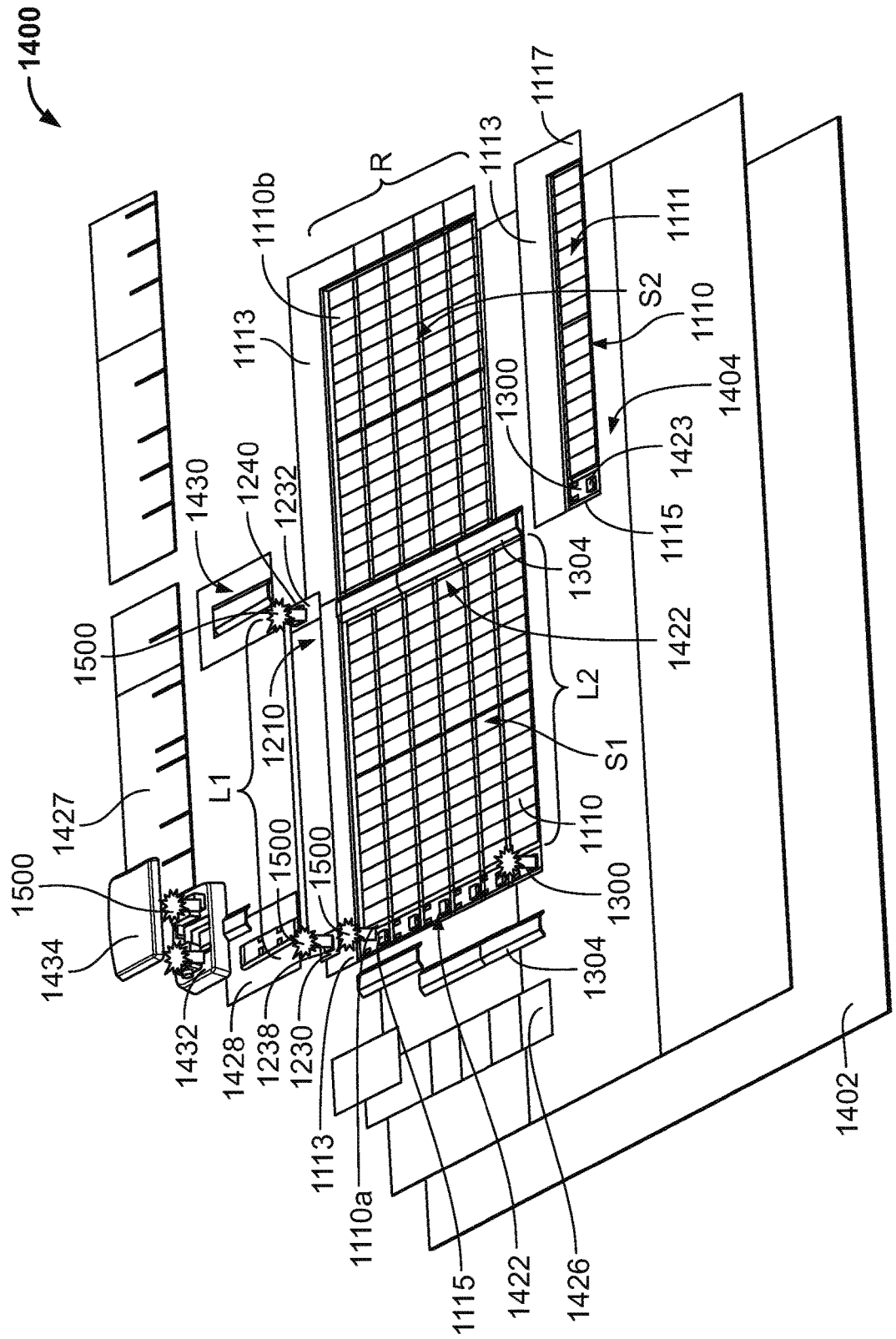
FIG. 11 is an exploded, top perspective view of a photovoltaic system.

Referring to FIG. 11, in some embodiments, a photovoltaic system 1400 includes an underlayment layer 1404 installed on a roof deck 1402. In some embodiments, the photovoltaic system 1400 includes a plurality of the photovoltaic modules 1110. In some embodiments, the plurality of photovoltaic modules 1110 overlay the underlayment layer 1404. In some embodiments, the photovoltaic modules 1110 are arranged in an array on the roof deck 1402. In some embodiments, the array of the photovoltaic modules 1110 includes subarrays S1, S2. In certain embodiments, the array includes more than the two subarrays S1, S2. In some embodiments, the array includes a single array S1. In some embodiments, each of the subarrays S1, S2 include a plurality of rows R of the photovoltaic modules 1110.

In some embodiments, the photovoltaic system 1400 includes at least one indicator 1500. In some embodiments, the at least one indicator 1500 is electrically connected to the photovoltaic modules 1110. In some embodiments, the at least one indicator 1500 is configured to visually indicate at least one electrically active component of the photovoltaic system 1400. In some embodiments, the at least one indicator 1500 includes a plurality of indicators 1500. In some embodiments, the indicator 1500 is a visible indicator. In some embodiments, the visible indicator is an illuminated light source. In some embodiments, the illuminated light source is a light emitting diode (LED). In some embodiments, the light emitting diode is a colored light emitting diode (LED). In some embodiments, the indicator 1500 is configured to provide a steady or constant illumination. In some embodiments, the indicator 1500 is configured to provide intermittent illumination (e.g., a flashing light). In some embodiments, the intermittent illumination is patterned. In some embodiments, the intermittent illumination is random. In some embodiments, the voltage difference (between Voc and Vmp) is utilized to toggle a state machine and turn on or off the indicator 1500. In some embodiments, locations of the at least one indicator 1500 is described hereinbelow.

Figure 12A:
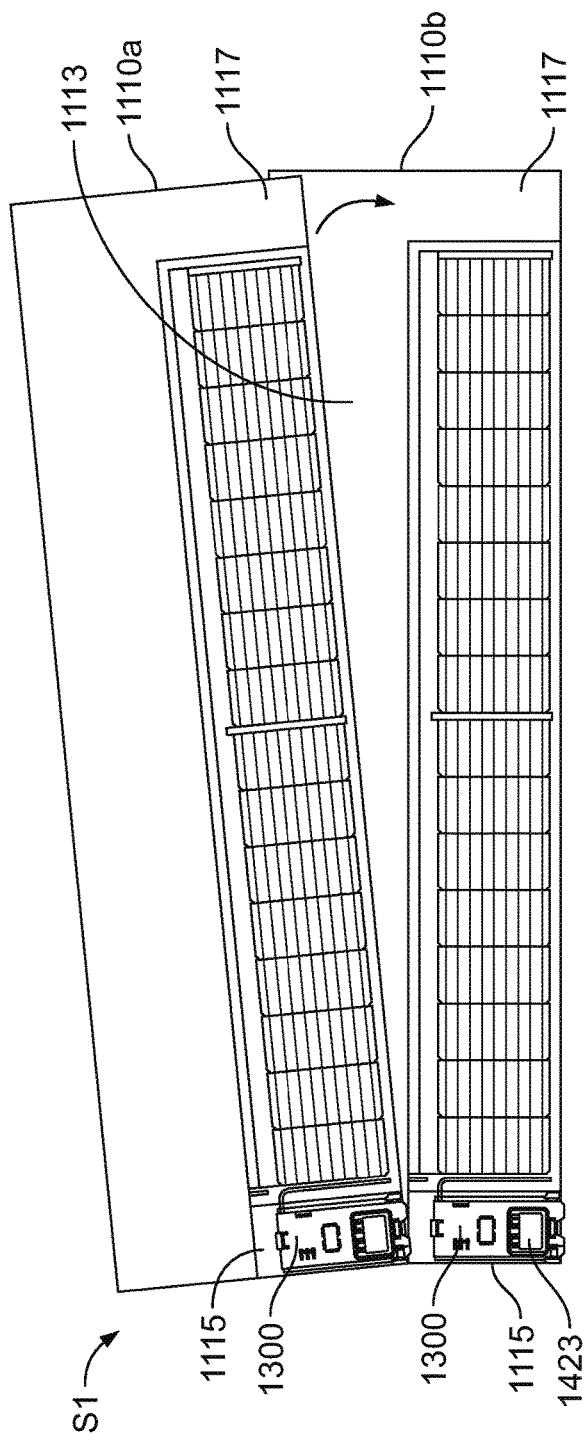
FIGS. 12A and 12B are views of embodiments of photovoltaic modules and associated wire cover brackets.
Figure 12B:
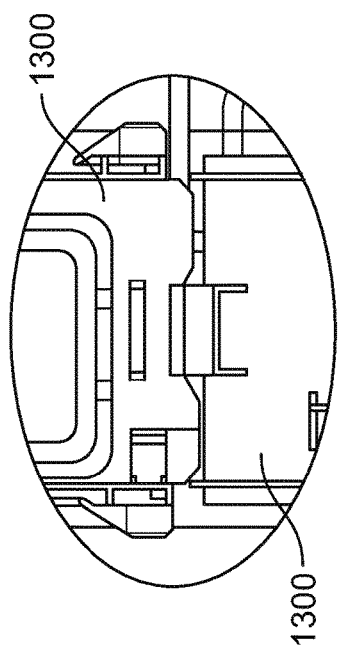

Referring to FIGS. 12A and 12B, in some embodiments, the reveal portion 1111 of one 1110*a* of the photovoltaic modules 1110 in the subarray S1 overlays the head lap portion 1113 of an adjacent another one of the photovoltaic modules 1110*b* of the subarray S1. In some embodiments, at least a portion of the first side lap 1115 of the one of the photovoltaic modules 1110*a* overlays at least a portion of the first side lap 1115 of the another one of the photovoltaic modules 1110*b*. In some embodiments, at least a portion of the second side lap 1117 of the one of the photovoltaic modules 1110*a* overlays at least a portion of the second side lap 1117 of the another one of the photovoltaic modules 1110*b*. In some embodiments, the wire cover bracket 1300 of the photovoltaic module 1110*a* overlaps the wire cover bracket 1300 of the photovoltaic module 1110*b*.

In some embodiments, the overlay of the first side laps 1115 form at least one wireway 1422. In some embodiments, the at least one wireway 1422 includes a plurality of wireways. In some embodiments, the at least one wireway 1422 includes a plurality of the wire cover brackets 1300. In some embodiments, the wire cover brackets 1300 are aligned in a column.

Figure 13:
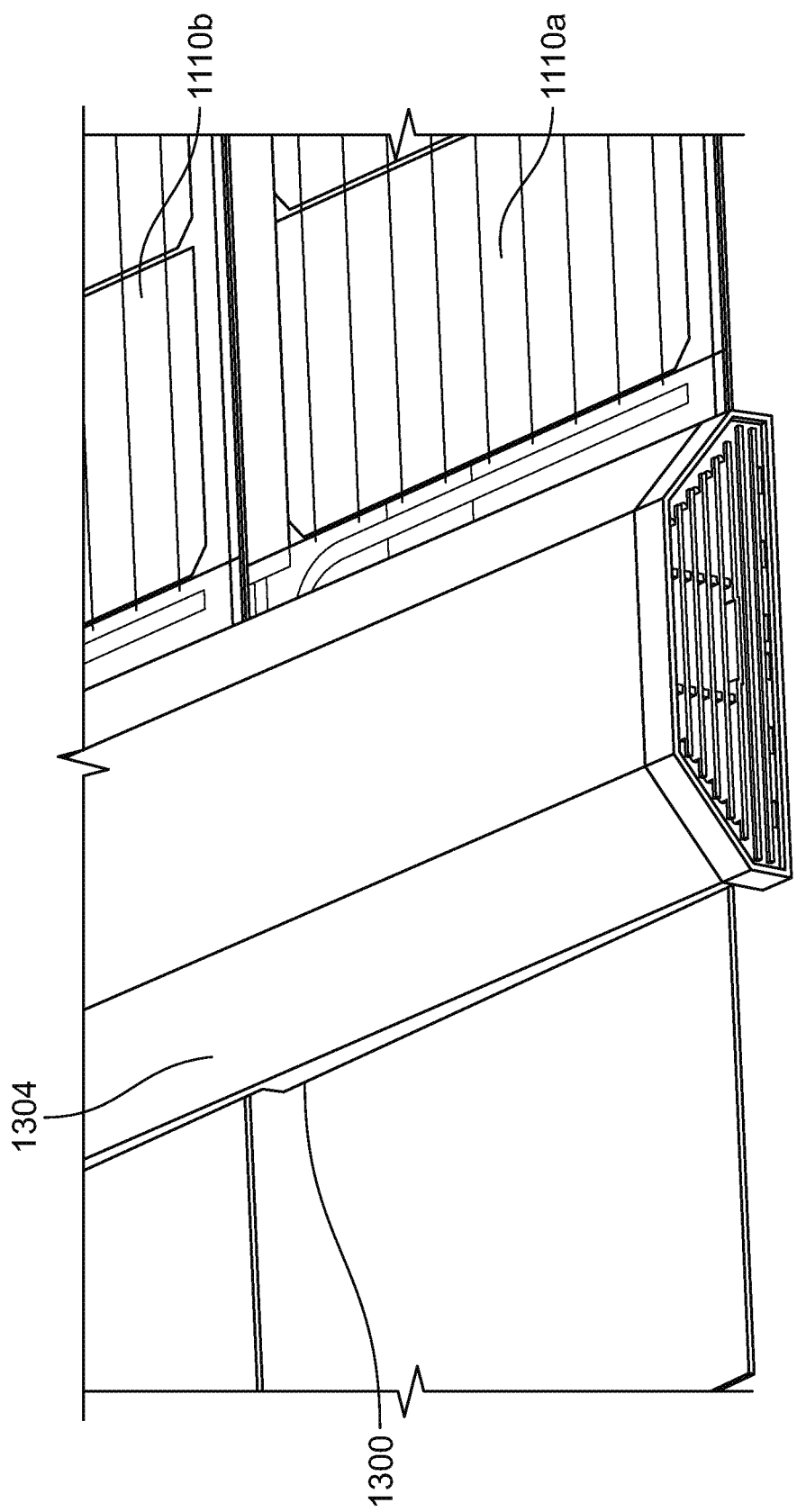
FIG. 13 is a top perspective view of embodiments of a cover installed on wire cover brackets.

Referring to FIGS. 11 and 13, in some embodiments, at least one of the cover 1304 is attached to at least a corresponding one of the wire cover brackets 1300. In some embodiments, the at least one cover 1304 is removably attached to at least a corresponding one of the wire cover brackets 1300. In some embodiments, one of the covers 1304 is attached to a plurality of the wire cover brackets 1300. In some embodiments, the at least one cover 1304 includes a plurality of covers 1304. In some embodiments, each of the plurality of covers 1304 is configured to removably interlock with one another.

With reference to FIG. 11, in some embodiments, the first side lap 1115 of one of the photovoltaic modules 1110 in the subarray S2 overlays the second side lap 1117 of an adjacent another one of the photovoltaic modules 1110 in the subarray S1 in the same one of the rows R. In some embodiments, one of the jumper modules 1210 overlays an uppermost one of the photovoltaic modules 1110a in a column of the subarray S1. In some embodiments, the active portion 1212 of the jumper module 1210 overlays the head lap portion 1113 of the photovoltaic module 1110a. In some embodiments, the active portion 1212 of the jumper module 1210 overlays a portion of the head lap portion 1113 of the photovoltaic module 1110a. In some embodiments, the active portion 1212 of the jumper module 1210 overlays the entirety of the head lap portion 1113 of the photovoltaic module 1110a. In some embodiments, the first side lap 1230 of the jumper module 1210 aligns with the first side lap 1115 of the photovoltaic module 1110a.

In some embodiments, the second side lap 1232 of the jumper module 1210 aligns with the second side lap 1117 of the photovoltaic module 1110a. In some embodiments, the first junction box 1238 of the jumper module 1210 is electrically connected to a junction box 1423 of the photovoltaic module 1110a. In some embodiments, the second junction box 1240 of the jumper module 1210 is electrically connected to the junction box 1423 of another of the photovoltaic modules 1110b. In some embodiments, the jumper module 1210 electrically connects the subarrays S1, S2 of the photovoltaic modules 1110 within the array of the photovoltaic system 1400. In some embodiments, the first bus ribbon 1250 and the second bus ribbon 1260 electrically connect the subarrays of the photovoltaic modules 1110 with one another. In some embodiments, the first bus ribbon 1250 and the second bus ribbon 1260 electrically connect the junction boxes 1423 of the first subarray S1 of the photovoltaic modules 1110 with the junction boxes 1423 of the second subarray S2 of the photovoltaic modules 1110.

In some embodiments, the jumper module 1210 is coplanar with the plurality of photovoltaic modules 1110. As used herein, the term "coplanar" means the jumper module 1210 and the plurality of photovoltaic modules 1110 are positioned and extend within the same plane, or the jumper module 1210 is positioned and extends in a first plane, and the plurality of photovoltaic modules 1110 is positioned and extends within a second plane that is offset from the first plane of no more than ten percent of a height measured from the roof deck 1402 to an upper surface of the jumper module 1210.

In some embodiments, a plurality of step flaps 1426 is installed adjacent to one of the subarrays S1 of the photovoltaic modules 1110. In some embodiments, roofing shingles are configured to overlay the step flaps 1426. In some embodiments, the roofing shingles are asphalt shingles. In some embodiments, the roofing shingles are electrically inactive solar shingles. In some embodiments, a roofing shingle 1427 overlays the active portion 1212 of the jumper module 1210. In some embodiments, another one of the jumper module 1210 overlays the jumper module 1210 of the first subarray, as shown in FIG. 11. In some embodiments, the roofing shingle 1427 conceals the jumper modules 1210. In some embodiments, the roofing shingle 1427 is a watershedding layer. In some embodiments, the roofing shingle 1427 is an asphalt shingle. In some embodiments, the roofing shingle 1427 is located at least 36 inches away from the roof ridge.

In some embodiments, the second side lap 1117 of at least one of the photovoltaic modules 1110 of the subarray S2 overlaps a roofing shingle. In some embodiments, the roofing shingle is an asphalt shingle. In some embodiments, the second layer 1132 of the backsheet 1128 is attached to the roofing shingle by an adhesive. In some embodiments, the adhesive is a butyl adhesive. In some embodiments, a fleece layer and an adhesive are utilized between the second layer 1132 of the backsheet 1128 and the roofing shingle to secure the bonding thereof. In some embodiments, the second layer 1132 of the backsheet 1128 is attached to the roofing shingle by plasma treatment. In some embodiments, the second layer 1132 of the backsheet 1128 is attached to the roofing shingle by a combination of any of the adhesive, the fleece layer and/or plasma treatment. In some embodiments, one or more roofing shingle overlays the second side laps 1117 of the photovoltaic modules 1110 of the subarray S2. In some embodiments, the roofing shingle is an asphalt shingle.

Figure 14:
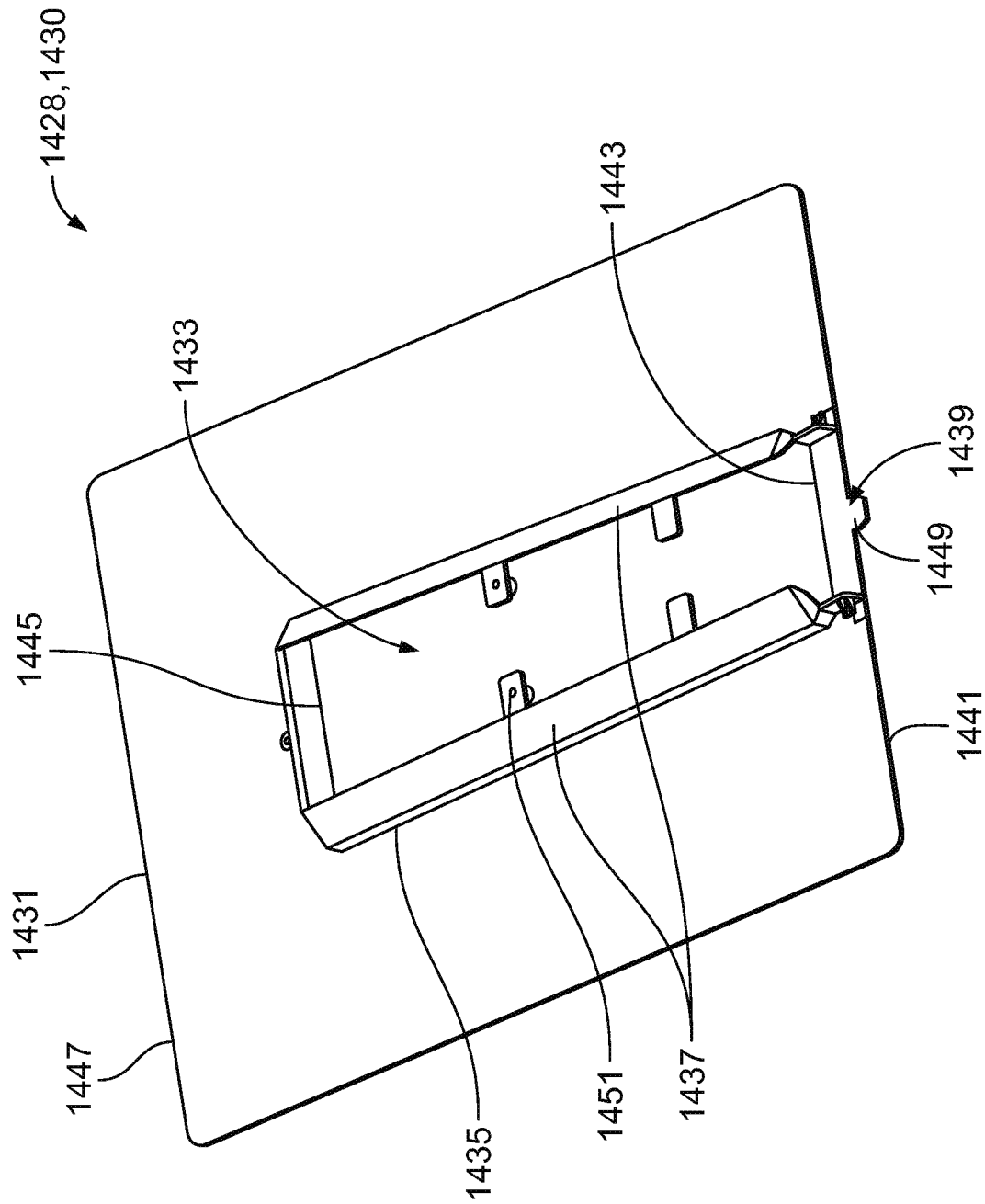
FIG. 14 is a top perspective view of embodiments of a first flashing base employed by the photovoltaic system shown in FIG. 11.
Figure 15:
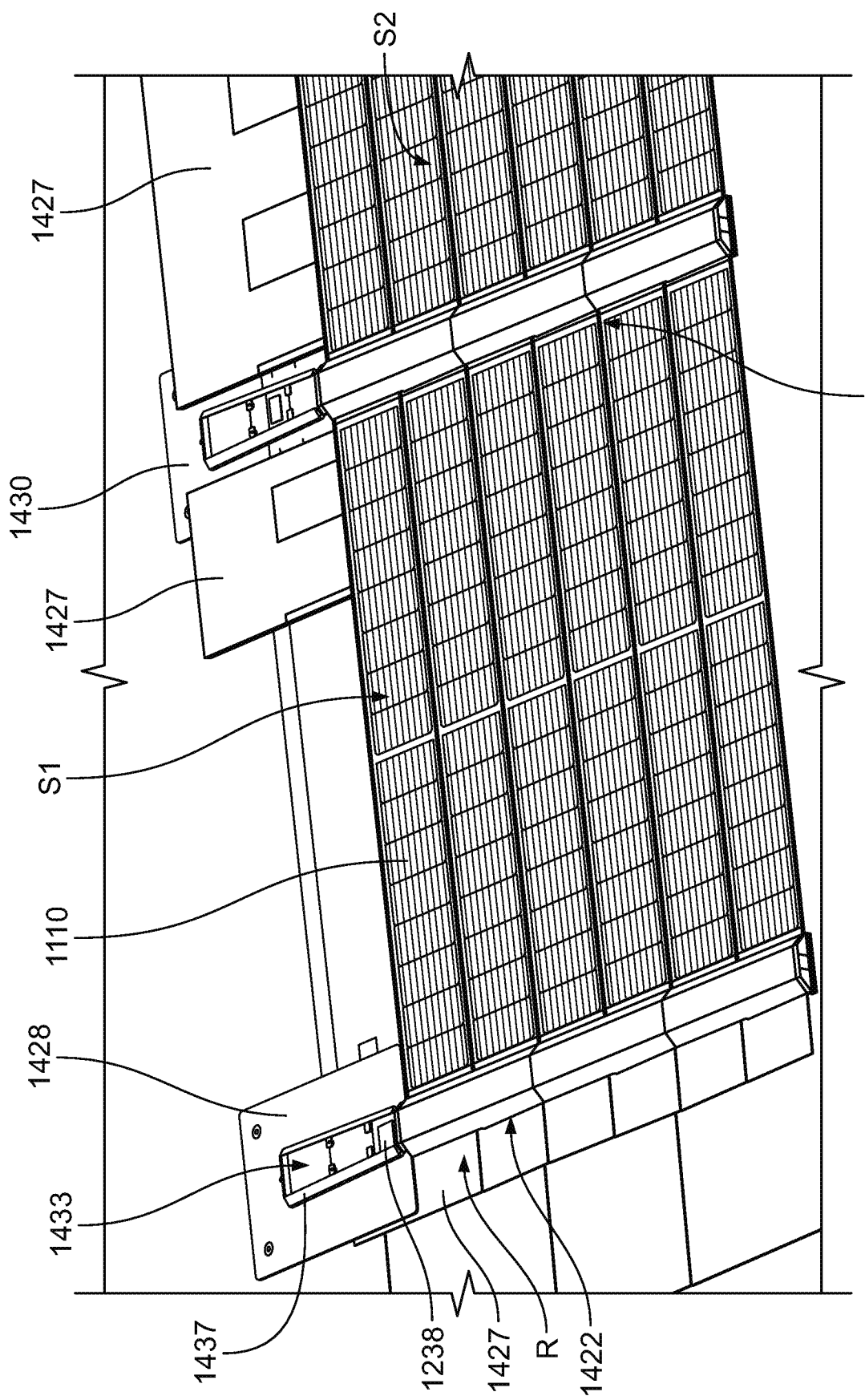
FIG. 15 is a top perspective view of embodiments of flashing bases installed on a roof deck.

Referring to FIGS. 11, 14 and 15, in some embodiments, the photovoltaic system 1400 includes a first flashing base 1428. In some embodiments, the first flashing base 1428 includes a flat base portion 1431 having a first surface and a second surface opposite the first surface, an aperture 1433 extending from the first surface to the second surface, and a sidewall 1435 extending from the first surface to the second surface and surrounding the aperture 1433. In some embodiments, the base portion 1431 is rectangular in shape. In some embodiments, the base portion 1431 is square in shape. In some embodiments, the base portion 1431 is trapezoidal in shape. In some embodiments, the base portion 1431 is circular in shape. In some embodiments, the sidewall 1435 includes flanged portions 1437 extending obliquely and inwardly. In some embodiments, an opening 1439 is located proximate to a lower end 1441 of the first flashing base 1428. In some embodiments, the aperture 1433 is substantially rectangular in shape. In some embodiments, the aperture 1433 extends from a first end 1443 located proximate to the lower end 1441 of the first flashing base 1428 and a second end 1445 located intermediate the lower end 1441 and an upper end 1447 of the first flashing base 1428. In some embodiments, the aperture 1433 is sized and shaped to receive at least one electrical component therein. In some embodiments, the second end 1445 includes a width that is wider than a width of the first end 1443. In some embodiments, the wider width of the second end 1445 is sized and shaped to receive relatively larger sized electrical components. In some embodiments, the at least one electrical component is the junction box 1238 of the jumper module 1210. In some embodiments, the lower end 1441 of the first flashing base 1428 includes a tab 1449. In some embodiments, screw tabs 1451 are located on the flanged portions 1437 and/or an upper end of the sidewall 1435.

In some embodiments, the first flashing base 1428 is configured to be installed on the roof deck 1402. In some embodiments, the first flashing base 1428 is installed at the top of the wireway 1422 of the subarray S1. In some embodiments, the sidewall 1435, the aperture 1433 and the flanged portions 1437 of the first flashing base 1428 are aligned with the wire cover bracket 1300 of the photovoltaic module 1110 in the uppermost row R of the subarray S1. In some embodiments, the tab 1449 is sized and shaped to contact an end of the wire cover bracket 1300.

In some embodiments, a first flashing base 1428 overlays the first side lap 1230 of the jumper module 1210. In some embodiments, the first flashing base is 1428 is configured to be installed to the roof deck 1402 by at least one fastener. In some embodiments, the base portion 1431 is configured to receive the at least one fastener. In some embodiments, the at least one fastener includes a plurality of fasteners. In some embodiments, the plurality of fasteners is roofing nails. In some embodiments, the first flashing base is 1428 is configured to be installed to the roof deck by an adhesive. In some embodiments, the first flashing base 1428 overlays at least one of the step flaps 1426.

In some embodiments, the photovoltaic system 1400 includes a second flashing base 1430. In some embodiments, the second flashing base 1430 has a structure and function similar to those of the first flashing base 1428, with certain differences. In some embodiments, the second flashing base 1430 overlays the second side lap 1232 of the jumper module 1210. In some embodiments, the second flashing base 1430 is installed on the roof deck and is aligned with the wireway 1422 of the second subarray S2 in a manner similar to that of the first flashing base 1428.

In some embodiments, one of the roofing shingles 1427 overlays the base portion 1431 of the first flashing base 1428 on at least one side of the sidewall 1435 thereof. In some embodiments, each of a plurality of the roofing shingles 1427 overlays the base portion 1431 of the first flashing base 1428 on opposite sides of the sidewall 1435. In some embodiments, one of the roofing shingles 1427 overlays the base portion 1431 of the second flashing base 1430 on at least one side of the sidewall 1435 thereof. In some embodiments, each of a plurality of the roofing shingles 1427 overlays the base portion 1431 of the second flashing base 1430 on opposite sides of the sidewall 1435. In some embodiments, the roofing shingles 1427 are asphalt shingles. In some embodiments, the roofing shingles 1427 are composition shingles. In some embodiments, the roofing shingles 1427 are non-asphaltic shingles. In some embodiments, the roofing shingles 1427 are composed of a polymer. In some embodiments, the roofing shingles 1427 are composed of thermoplastic polyolefin (TPO).

Referring to FIGS. 11 and 16A and 16B, in some embodiments, a transition box 1432 is installed on the first flashing base 1428. In some embodiments, the transition box 1432 includes a housing 1453 having an interior portion 1455. In some embodiments, the interior portion includes at least one base 1457. In some embodiments, the at least one base 1457 is configured to receive an electrical component mounted thereto. In some embodiments, the at least one base 1457 includes a plurality of the bases 1457. In some embodiments, the interior portion 1455 includes an aperture 1459 that extends through a bottom portion of the housing 1453. In some embodiments, a cover portion 1461 extends outwardly from a lower wall 1463 of the housing 1453. In some embodiments, the cover portion 1461 includes flanged walls 1465. In some embodiments, the flanged walls 1465 are angled. In some embodiments, the cover portion includes tabs 1467 extending outwardly from the free end thereof.

In some embodiments, the transition box 1432 is installed on the first flashing base 1428 by fasteners. In some embodiments, the fasteners are screws that engage corresponding ones of the screw tabs 1451 of the first flashing base 1428. In some embodiments, the transition box 1432 is installed on the first flashing base 1428 by an adhesive. In some embodiments, the transition box 1432 is installed on the first flashing base 1428 by snap tabs. In some embodiments, the cover portion 1461 is sized and shaped to cover at least a portion of the sidewall 1435 and at least a portion of the aperture 1433 of the first flashing base 1428. In some embodiments, the flanged walls 1465 of the cover portion 1461 are juxtaposed with the flanged portions 1437 of the first flashing base 1428. In some embodiments, the tabs 1467 of the cover portion 1461 engage the cover 1304 of the wire cover bracket 1300. In some embodiments, the cover portion 1461 slidably engages the cover 1304 of the wire cover bracket 1300, such that a lower end of the cover portion 1461 is juxtaposed with an upper end of the cover 1304. In some embodiments, the cover portion 1461 of the transition box 1432 covers the first junction box 1238 of the jumper module 1210.

In some embodiments, the housing 1453 of the transition box 1432 is sized and shaped to cover at least another portion of the sidewall 1435 and at least a portion of the aperture 1433 of the first flashing base 1428. In some embodiments, at least a portion of the aperture 1459 of the transition box 1432 is substantially aligned with the aperture 1433 of the first flashing base 1428. In some embodiments, the aperture 1459 and the aperture 1433 substantially align with an aperture or penetration within the roof deck 1402. In some embodiments, the transition box 1432 covers the aperture or penetration in the roof deck 1402 and is used as part of a pathway to run electrical wiring therethrough. In some embodiments, a passthrough 1460 is located within the aperture 1459 and the aperture 1433. In some embodiments, the passthrough 1460 is inserted within the aperture or penetration of the roof deck 1402. In some embodiments, the passthrough 1460 is configured to receive an electrical wire or cable to facilitate its insertion through the roof deck aperture an into the associated structure.

Figure 17:
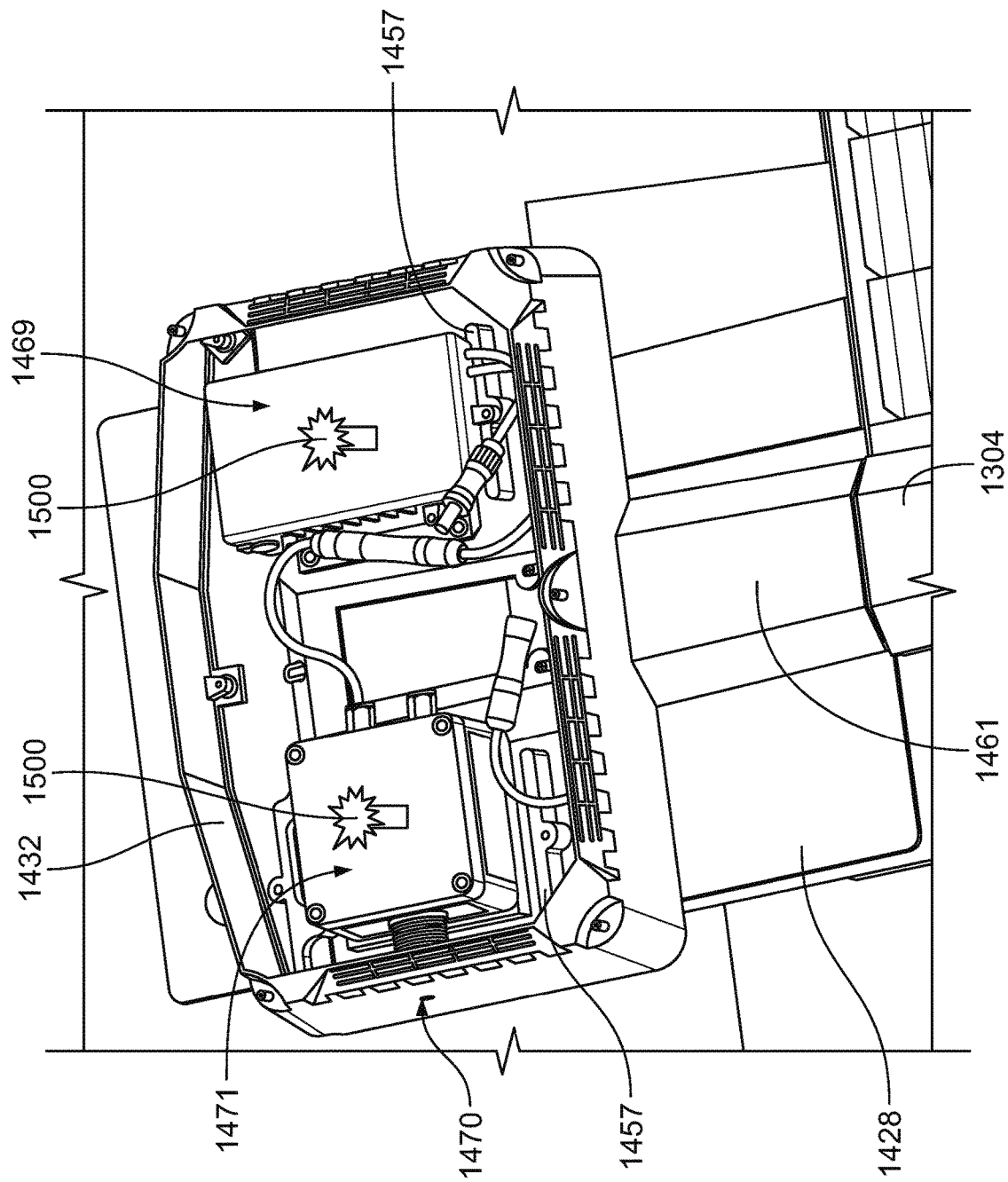

Referring to FIG. 17, in some embodiments, the transition box 1432 includes power electronics for the photovoltaic system 1400. In some embodiments, the transition box 1432 includes a rapid shutdown device (RSD). In some embodiments, the transition box 1432 includes a middle circuit interrupter (MCI) 1469. In some embodiments, the transition box includes a splice box 1471. In some embodiments, the transition box 1432 houses electrical wiring for the photovoltaic system 1400. In some embodiments, the electrical wiring includes THHN electrical wiring. In some embodiments, the THHN electrical wire is electrically connected to an inverter. In some embodiments, the rapid shutdown device (RSD) is located within 1 foot of the subarray S1. In some embodiments, the inverter drives the output voltage of the subarrays S1, S2 to a point where the inverter can extract the most power (Vmp). In some embodiments, the inverter drives the output voltage of the subarrays S1, S2 of 80% to 85% of the maximum voltage or open circuit voltage (Voc) of the photovoltaic system 1400. In some embodiments, Voc is greater than Vmp. In some embodiments, the inverter is configured to be shut down by a user by turning off a DC switch at the inverter. In some embodiments, the inverter is configured to be shut down by a user by turning off an AC breaker. In some embodiments, when the inverter is shut down, home-run cables between the subarrays S1, S2 and the inverter are de-energized. In some embodiments, the home-run cables between the subarrays S1, S2 and the inverter are de-energized to less than 30 volts in less than 30 seconds. In some embodiments, the photovoltaic modules 1110*a*, 1110*b* are in their open circuit voltage condition (Voc) with no current flowing.

Figure 18:
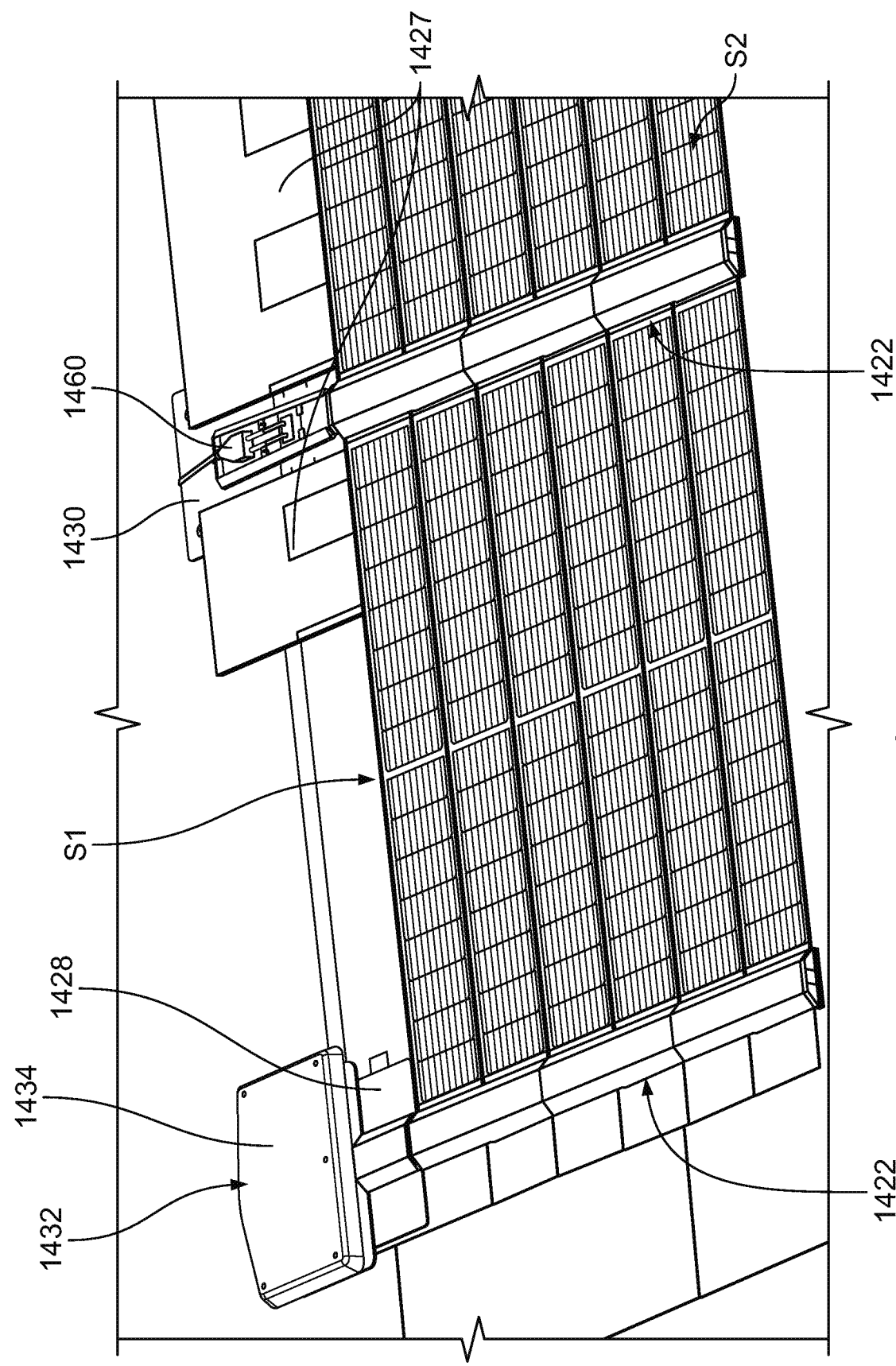
FIG. 18 is a top perspective view of embodiments of the transition box shown in FIGS. 16A through 17 installed on a roof deck.
Figure 18A:
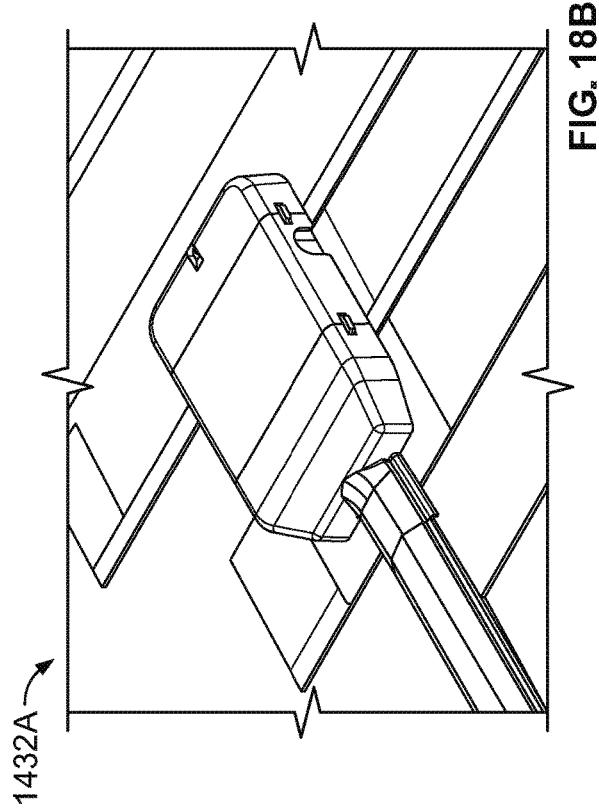
FIGS. 18A through 18D illustrate some embodiments of a transition box.
Figure 18B:
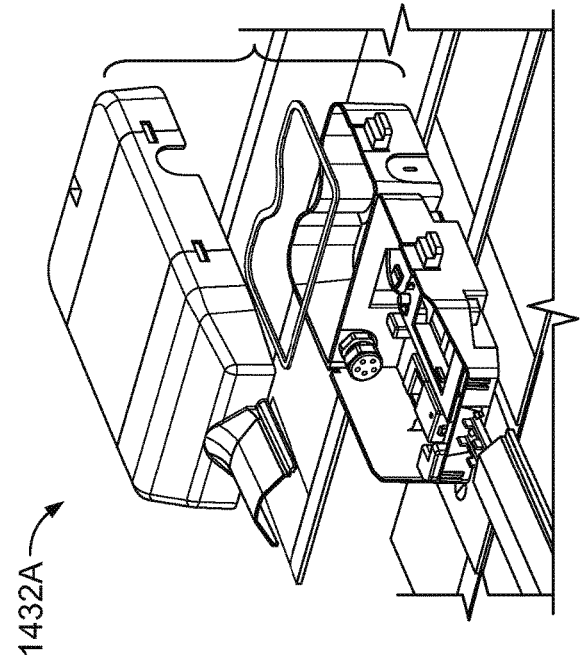
Figure 18D:
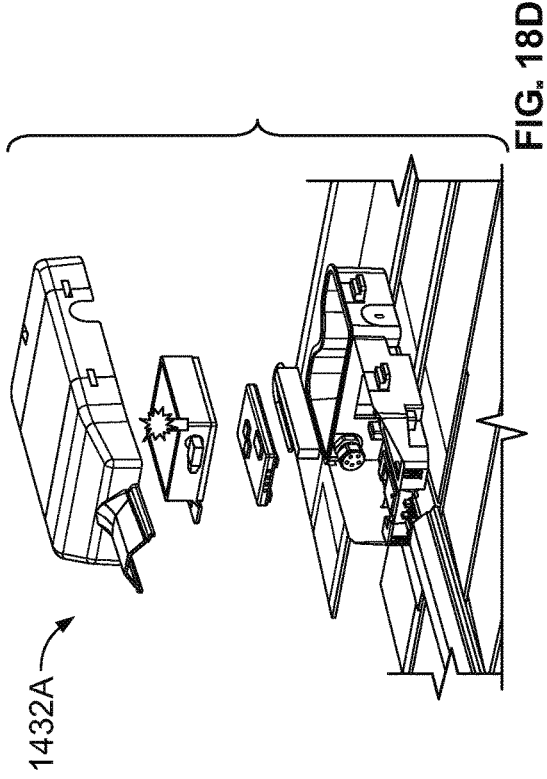
Figure 18C:
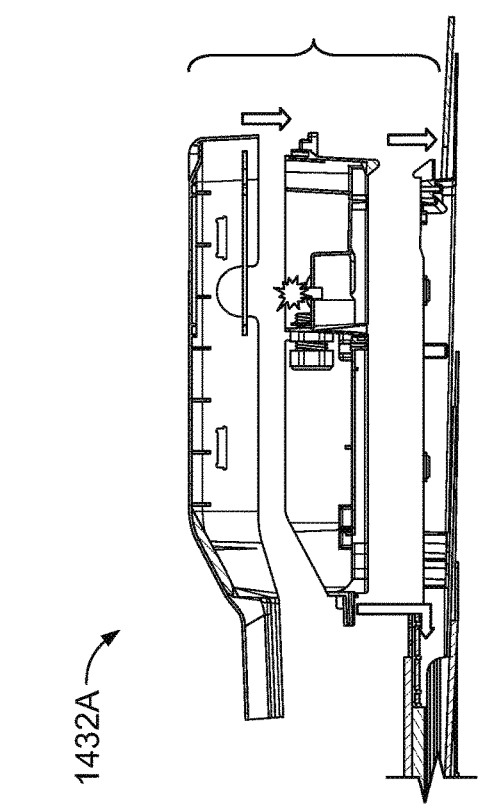

Referring to FIG. 18, in some embodiments, the transition box 1432 includes a cover 1434. In some embodiments, the cover 1434 is removably attached to the housing 1453. In some embodiments, the cover 1434 includes an interior surface. In some embodiments, the interior surface includes an interior wall structure that is configured to provide structural integrity and strength to the cover 1434. In some embodiments, the interior wall structure is configured to maintain its structural integrity due to hail impacts. In some embodiments, the interior wall structure is a honeycomb structure. In some embodiments, a sidewall 1470 of the transition box 1432 is configured to have an aperture formed therein, either by drilling or cutting. In some embodiments, the aperture is sized and shaped to receive a conduit connected to the splice box 1471. In some embodiments, the conduit is configured to house and run electrical wiring across the roof.

FIGS. 18A through 18D show other embodiments of a transition box 1432A.

Figure 19:
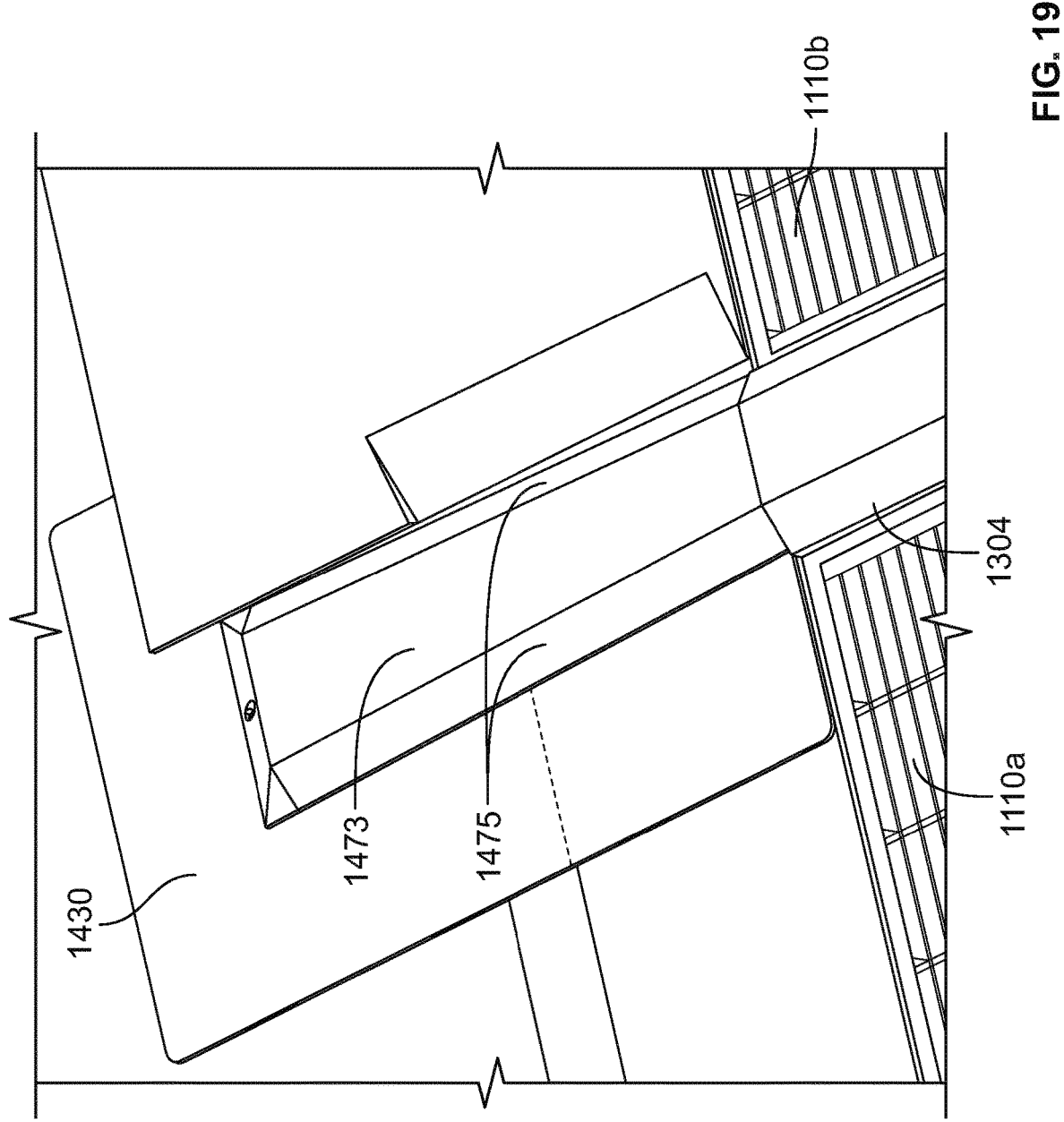
FIG. 19 is a top perspective view of embodiments of a second flashing base employed by the photovoltaic system shown in FIG. 11.

Referring to FIG. 19, in some embodiments, the second flashing base 1430 includes a cover 1473. In some embodiments, the cover 1473 is sized and shaped to cover the aperture 1433 of the second flashing base 1430. In some embodiments, flanged walls 1475 of the cover 1473 are juxtaposed with the flanged portions 1437 of the second flashing base 1430. In some embodiments, the cover portion 1461 slidably engages the cover 1304 of the wire cover bracket 1300, such that a lower end of the cover 1473 is juxtaposed with an upper end of the cover 1304. In some embodiments, the cover 1473 covers the second junction box 1240 of the jumper module 1210.

Figure 20:
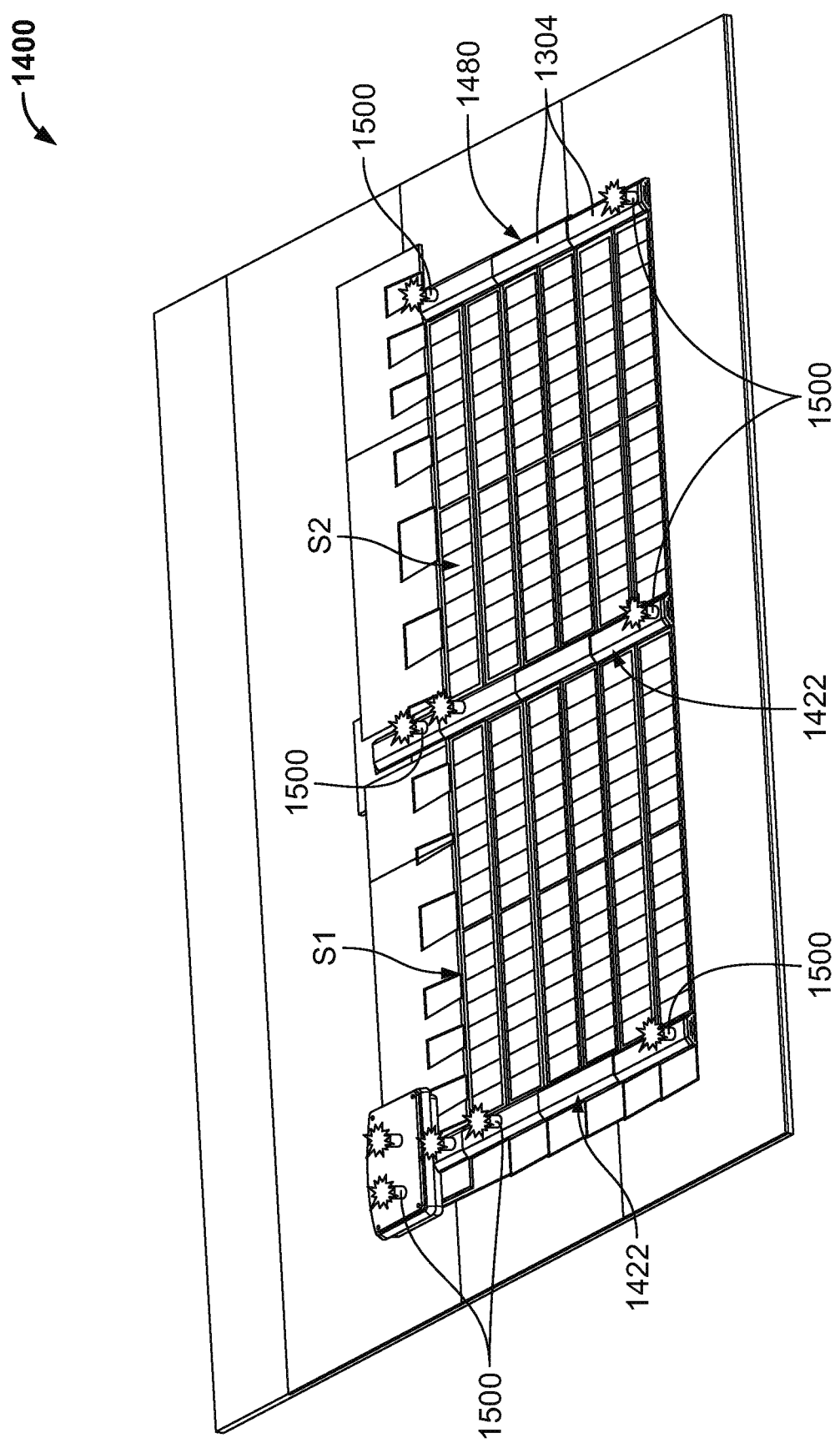
FIGS. 20 and 20A are top perspective views of embodiments of a building integrated photovoltaic system installed on a roof deck.

Referring to FIG. 20, in some embodiments, the photovoltaic system 1400 is installed on the roof deck 1402. In some embodiments, an additional, non-active (i.e., "dummy") wireway 1480 and associated cover 1304, similar to the at least one wireway 1422 and the associated covers 1304, may be installed on the end of the second subarray S2 for symmetry and aesthetics. In some embodiments, the non-active wireway 1480 is installed over the second side laps 1117 of the photovoltaic modules 1110*b*. In some embodiments, the non-active wireway 1480 does not include any electrical components or electrical wiring. In some embodiments, the non-active wireway 1480 includes electrical components and/or electrical wiring. In some embodiments, the non-active wireway 1480 is optional and need not be included. In some embodiments, roofing shingles overlay the second side laps 1117 of the photovoltaic modules 1110*b* of the second subarray S2. In some embodiments, it should be understood that the non-active wireway 1480 or roofing shingles may overlay the second side laps 1117 of the photovoltaic modules 1110*a* of the first subarray S1 in the absence of the second subarray S2.

Referring to FIGS. 17 and 20, in some embodiments, at least one of the electronic component in the transition box 1432 includes at least one of the indicator 1500. In some embodiments, the rapid shutdown device (RSD) include at least one of the indicator 1500. In some embodiments, the middle circuit interrupter (MCI) 1469 includes at least one of the indicator 1500. In some embodiments, the splice box 1471 includes at least one of the indicator 1500. In some embodiments, the cover 1434 of the transition box 1432 includes a transparent section. In some embodiments, the transparent section of the cover 1434 is configured to enable visible perception of the at least one indicator 1500 when it is active (e.g., illuminated). In some embodiments, the indicator 1500 is not illuminated during normal operation of the photovoltaic system 1400. In some embodiments, the indicator 1500 is configured to turn on and illuminate when the rapid shutdown device is triggered. In some embodiments, the indicator 1500 is configured to turn on and illuminate when the inverter is shut down. In some embodiments, the indicator 1500 is configured to turn on and illuminate when the electrical voltage of the photovoltaic system 1400 is less than or equal to the predetermined voltage level. In some embodiments, the predetermined voltage level is 0.1 volt to 30 volts. In some embodiments, the indicator 1500 is configured to turn on and illuminate when a loss of a power line communication (PLC) signal to the rapid shutdown device is detected.

In some embodiments, the indicator 1500 is configured to show different status colors. In some embodiments, the indicator 1500 is configured to show different status colors, each of which depend on a measurable condition of either or both of the subarrays S1, S2. In some embodiments, the indicator 1500 is configured to show a first color when a voltage of the subarray S1 is a first value above a predetermined voltage level. In some embodiments, the first color is green. In some embodiments, the indicator 1500 is configured to show a second color when a voltage of the subarray S1 is above below a predetermined voltage level by at least a second value. In some embodiments, the second color is yellow. In some embodiments, the indicator 1500 is configured to show a third color when a voltage of the subarray S1 is above below a predetermined voltage level by at least a third value. In some embodiments, the third color is red. In some embodiments, a status of the indicator 1500 is communicated to a user. In some embodiments, the third color is red.

In some embodiments, a status of the indicator 1500 is communicated electronically a user. In some embodiments, the third color is red. In some embodiments, the indicator 1500 is configured to pulse out a code. In some embodiments, the code is representative of the status of the voltage of the subarray S1. In some embodiments, the indicator 1500 is configured to pulse out a first code when a voltage of the subarray S1 is above a predetermined voltage level by a first value. In some embodiments, the indicator 1500 is configured to pulse out a second code when a voltage of the subarray S1 is above below a predetermined voltage level by at least a second value. In some embodiments, the indicator 1500 is configured to pulse out a third code when a voltage of the subarray S1 is above below a predetermined voltage level by at least a third value. In some embodiments, a status of the indicator 1500 is communicated to an electronic device of a user. In some embodiments, the electronic device is a computer device. In some embodiments, the electronic device is a personal computer, laptop computer, smartphone, computer tablet, or a smart watch. It is understood that the foregoing function of the indicator 1500 may be applied to the subarray S2. In some embodiments, the predetermined voltage level is programmable by a user. In some embodiments, the predetermined voltage level is field programmable by a user.

In some embodiments, the indicators 1500 remains in an inactive (e.g., off or dark) states when the inverter is operating within normal parameters. In some embodiments, when the array S1, S2 are not activated and not powered during normal operation (e.g., at night), the indicators 1500 remain in their inactive state.

In some embodiments, at least one of the indicators 1500 is activated when the at least one bypass diode 1123 fails. In some embodiments, the failure of the at least one bypass diode 1123 may be caused by a long period at high current and high temperature when they are actively bypassing shaded cells 1112, or due to their peak inverse voltage rating being exceeded such as when a nearby lightning strike occurs. In some embodiments, the failed at least one bypass diode 1123 results in a closed circuit with the connected solar cells 1112. In some embodiments, the indicator 1500 is configured to be electrically connected to the closed circuit and activate.

Figure 20A:
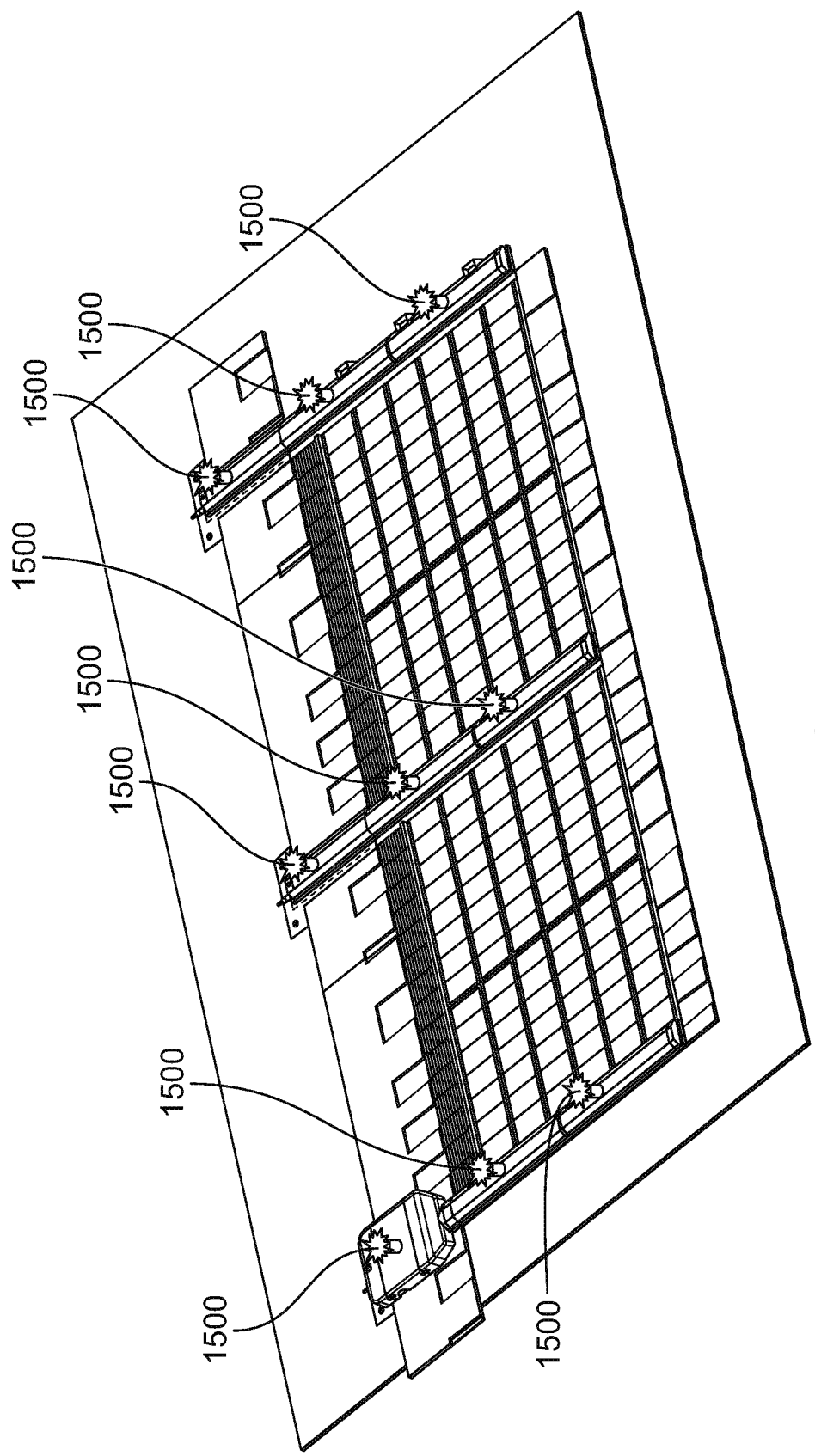

FIG. 20A illustrates another embodiment of a photovoltaic system including a plurality of the indicators 1500.

Figure 21:
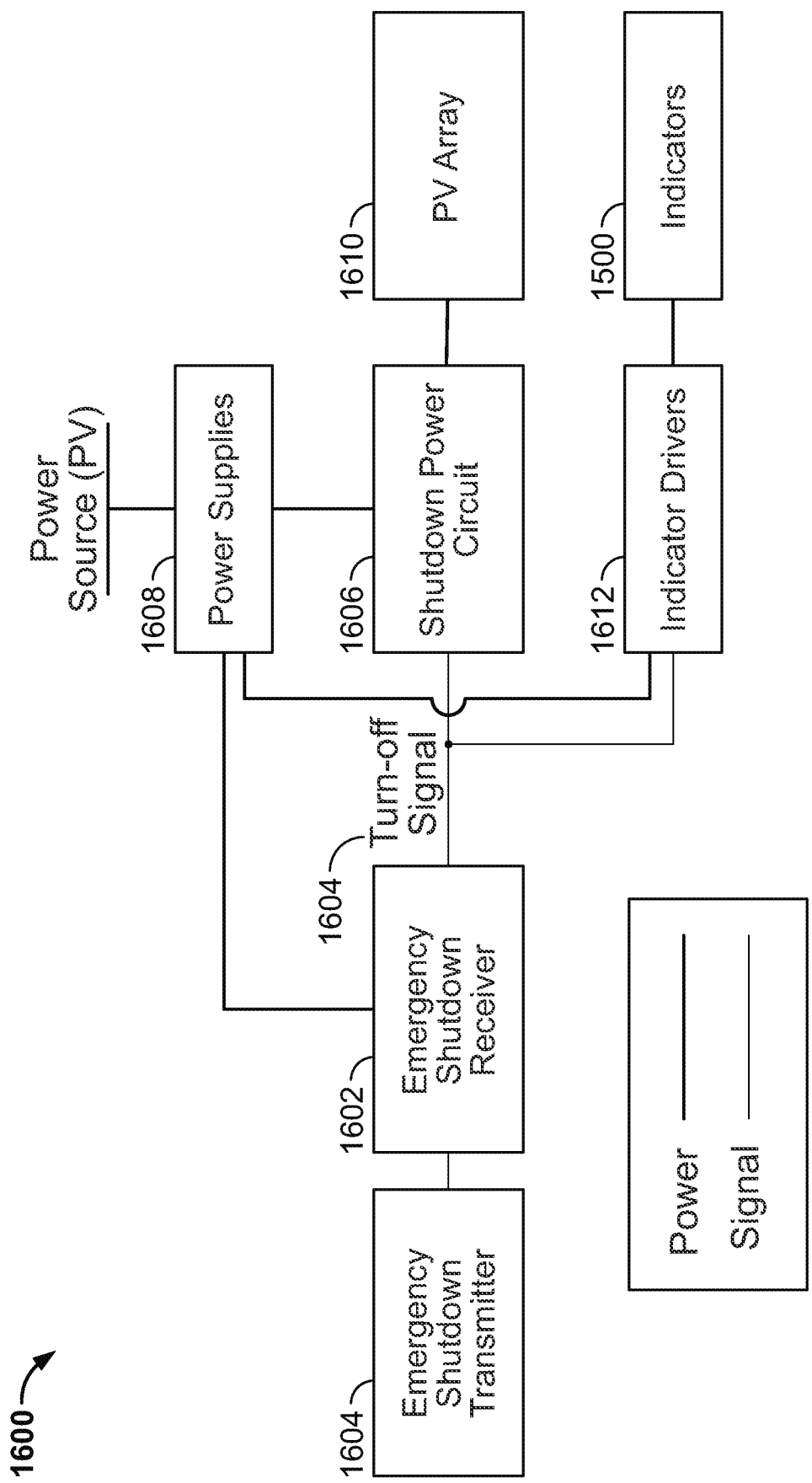
FIGS. 21 and 22 illustrate block-diagrams of some embodiments of indicators employed by a photovoltaic system.

FIG. 21 illustrates a block-diagram of some embodiments of the indicators 1500 integrated with a rapid shutdown system 1600. In some embodiments, the rapid shutdown system 1600 includes an emergency shutdown receiver 1602, an emergency shutdown transmitter 1604 electrically connected to the emergency shutdown receiver 1602, a shutdown power circuit 1606 electrically connected to the emergency shutdown receiver 1602, and a power supply 1608, all of which are electrically connected to a photovoltaic array (PV array) 1610 comprising a plurality of photovoltaic modules. In some embodiments, the rapid shutdown system 1600 includes an indicator circuit that comprises at least one indicator 1500 and indicator drivers 1612. In some embodiments, the indicator circuit is electrically connected to the emergency shutdown receiver 1602 and the shutdown power circuit 1606. In some embodiments, the indicator circuit is powered by the power supply 1608. In some embodiments, the power supply 1608 is a photovoltaic module. In some embodiment, the power supply 1608 is an independent source of power. In some embodiments, the power supply 1608 is an energy storage device. In some embodiments, the power supply 1608 is at least one battery. In some embodiments, the emergency shutdown receiver 1602 detects a shutdown command or senses a lack of a signal indicating normal operation. In some embodiments, the signal is a power line communication signal. In some embodiments, a shutdown code or word is transmitted by the emergency shutdown transmitter 1604 to the emergency shutdown receiver 1602. In some embodiments, the transmission of the shutdown code or word is via wired communication. In some embodiments, the transmission of the shutdown code or word is via wireless communication. In some embodiments, a user initiates a turn off state. In some embodiments, the indicator circuit utilizes the turnoff signal and activates the indicators 1500.

Figure 22:
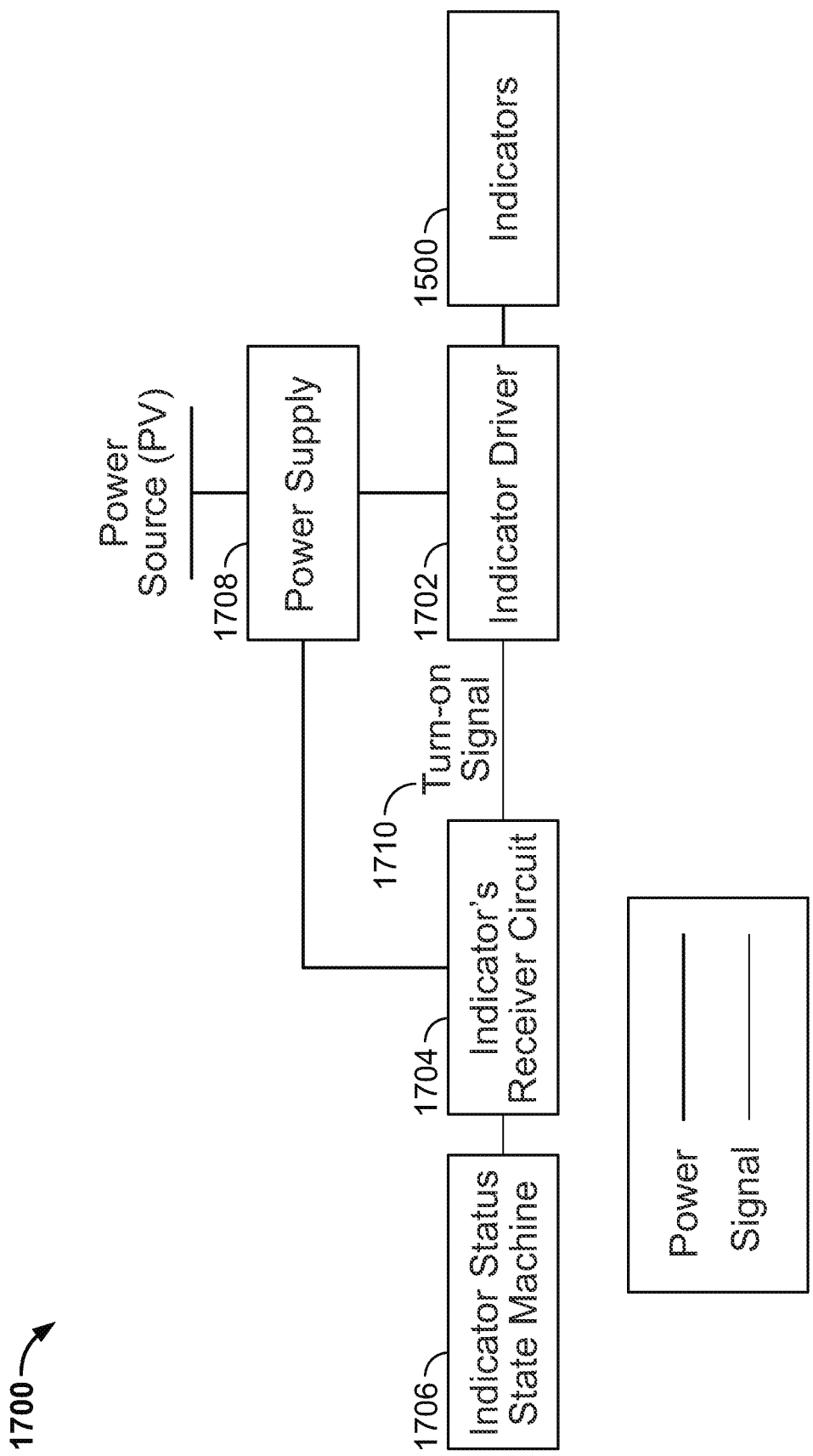

FIG. 22 illustrates a block-diagram of some embodiments of the indicators 1500 as part of a stand-alone system 1700 independent of the rapid shutdown device. In some embodiments, the system 1700 includes an indicator driver 1702, an indicator receiver circuit 1704 electrically connected to the indicator driver 1702, an indicator status state machine 1706 electrically connected to the indicator receiver circuit 1704, at least one of the indicators 1500 electrically connected to the indicator driver, and a power supply 1708. In some embodiments, the indicator receiver circuit 1704 detects a status state signal of the indicator status state machine 1706. In some embodiments, a turn-on signal 1710 is generated and the indicator driver 1702 turns on the indicators 1500. In some embodiments, the system 1700 includes switch to turn on and off the indicators 1500. In some embodiments, the switch is a wired switch. In some embodiments, the switch is a wireless switch.

Referring to FIGS. 11 and 20, in some embodiments, power electronic components (e.g., a rapid shutdown device (RSD), middle circuit interrupter (MCI), junction box) are located at a top portion of the wireway 1422. In some embodiments, the power electronic components are located at bottom portion of the wireway 1422. In some embodiments, at least one of the power electronic components includes at least one of the indicators 1500. In some embodiments, each of a plurality of the power electronic components includes at least one of the indicators 1500. In some embodiments, each of the covers 1304 of the corresponding wire cover brackets 1300 includes a transparent section. In some embodiments, the transparent section of the cover 1304 is configured to enable visible perception of the at least one indicator 1500 when it is active (e.g., illuminated).

In some embodiments, the junction box 1238 of the jumper module 1210 includes a voltage monitoring device and at least one of the indicators 1500. In some embodiments, the cover portion 1461 of the first flashing base 1428 includes a transparent section. In some embodiments, the transparent section of the cover portion 1461 is configured to enable visible perception of the at least one indicator 1500 when it is active (e.g., illuminated). In some embodiments, the junction box 1240 of the jumper module 1210 includes a voltage monitoring device and at least one of the indicators 1500. In some embodiments, the cover 1473 of the second flashing base 1430 includes a transparent section. In some embodiments, the transparent section of the cover 1473 is configured to enable visible perception of the at least one indicator 1500 when it is active (e.g., illuminated). In some embodiments, the voltage monitoring device is an in-laminate printed circuit board (PCB) or flex circuit. In some embodiments, the flex circuit is located on an exposed surface of the jumper module 1210. In some embodiments, the flex circuit is laminated within the active portion 1212 of the jumper module 1210. In some embodiments, the flex circuit is laminated within the frontsheet 1246 of the jumper module 1210.

In some embodiments, each of the photovoltaic modules 1110*a*, 1110*b* includes a voltage monitoring device and at least one of the indicators 1500. In some embodiments, the voltage monitoring device is an in-laminate printed circuit board (PCB) or flex circuit. In some embodiments, the flex circuit is located on an exposed surface of each of the photovoltaic modules 1110*a*, 1110*b*. In some embodiments, the flex circuit is laminated within the active area 1109 of the photovoltaic module 1110. In some embodiments, the flex circuit is laminated within the frontsheet 1116 of the photovoltaic module 1110. In some embodiments, the flex circuit is laminated within the first side lap 1115 of the photovoltaic module 1110.

In some embodiments, a method comprises the steps of:
monitoring an electrical voltage of the photovoltaic system 1400 wherein the photovoltaic system 1400 includes a plurality of the photovoltaic modules 1110 installed on a roof deck, wherein the photovoltaic modules 1110 are arranged in an array on the roof deck, wherein each of the photovoltaic modules 1110 includes a first end and a second end opposite the first end, at least one solar cell 1112, and at least one electrical component, a rapid shutdown device, wherein the rapid shutdown device is electrically connected to the at least one electrical component, and at least one visible indicator 1500, wherein the at least one visible indicator 1500 is electrically connected to the plurality of photovoltaic modules 1110;

activating the rapid shutdown device to reduce the electrical voltage of the photovoltaic system 1400 to a predetermined voltage level; and activating the at least one visible indicator 1500 when the electrical voltage of the photovoltaic system 1400 is less than or equal to the predetermined voltage level.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:
 a plurality of photovoltaic modules installed on a roof deck,
  wherein the photovoltaic modules are arranged in an array on the roof deck,
   wherein the array includes an upper surface,
   wherein the array includes a first subarray,
   wherein the first subarray includes a first side, a second side opposite the first side, an upper side extending from the first side to the second side, and a lower side extending from the first side to the second side,
  wherein each of the photovoltaic modules includes
   a first end and a second end opposite the first end,
   at least one solar cell, and
   a wire cover bracket located at the first end and configured to receive at least one electrical component,
   wherein the wire cover brackets of the plurality of photovoltaic modules of the first subarray are configured to form a wireway on the first side of the first subarray;
 a rapid shutdown device,
  wherein the rapid shutdown device is electrically connected to the at least one electrical component,
  wherein the rapid shutdown device is configured to reduce an electrical voltage of the system to a predetermined voltage level;
 a transition box,
  wherein the transition box is located above and adjacent to the wireway and above the upper side of the first subarray,
  wherein the rapid shutdown device is located within the transition box; and
 at least one first visible indicator above the upper surface,
  wherein the at least one first visible indicator is electrically connected to the plurality of photovoltaic modules,
  wherein the at least one first visible indicator is activated when the electrical voltage of the system is less than or equal to the predetermined voltage level; and
 at least one second visible indicator is located within the transition box,
  wherein the at least one second visible indicator is electrically connected to the rapid shutdown device, and
  wherein the at least one second visible indicator is activated when the rapid shutdown device is activated as a result of the electrical voltage of the system being less than or equal to the predetermined voltage level.

2. The system of claim 1, wherein each of the at least one first visible indicator and the at least one second visible indicator includes a light source.

3. The system of claim 2, wherein the light source of the at least one first visible indicator is a first light emitting diode (LED), and wherein the light source of the at least one second visible indicator is a second light emitting diode (LED).

4. The system of claim 1, wherein the at least one first visible indicator is located within a corresponding one of the wire cover bracket.

5. The system of claim 4, wherein the at least one first visible indicator includes a plurality of first visible indicators.

6. The system of claim 4, further comprising at least one cover removably attached to at least one of the wire cover brackets, wherein the at least one cover is configured to enable visible perception of the at least one first visible indicator when the at least one first visible indicator is active.

7. The system of claim 1, further comprising at least one voltage monitoring device, wherein the at least one voltage monitoring device is configured to measure the electrical voltage of the system.

8. The system of claim 7, further comprising a jumper module, wherein the jumper module electrically connects the first subarray of the array and a second subarray of the array.

9. The system of claim 8, wherein the jumper module includes a first junction box, wherein the at least one electrical component includes a second junction box, wherein the first junction box is electrically connected to the second junction box, and wherein the first junction box includes the at least one voltage monitoring device.

10. The system of claim 8, wherein the jumper module includes a plurality of layers, wherein the plurality of layers is laminated, and wherein the at least one voltage monitoring device is laminated within the plurality of layers of the jumper module.

11. The system of claim 9, wherein the at least one voltage monitoring device is a printed circuit board or flex circuit.

12. The system of claim 10, wherein at least one third visible indicator is located on the jumper module.

13. The system of claim 7, wherein the at least one voltage monitoring device includes a plurality of voltage monitoring devices, and wherein each of the plurality of voltage monitoring devices is located on a corresponding one of the plurality of photovoltaic modules.

14. The system of claim 1, wherein the at least one first visible indicator is electrically connected to the rapid shutdown device.

15. The system of claim 1, wherein the predetermined voltage level is 0.1 volt to 30 volts.

16. The system of claim 1, wherein the at least one first visible indicator displays a first color when the electrical voltage has a first value, and wherein the at least one first visible indicator displays a second color different from the first color when the electrical voltage has a second value, wherein the second value is different from the first value.

17. The system of claim 1, wherein the at least one first visible indicator displays a first flashing code when the electrical voltage has a first value, and wherein the at least one first visible indicator displays a second flashing code different from the first flashing code when the electrical voltage has a second value, wherein the second value is different from the first value.

18. The system of claim 6, wherein the at least one cover includes a transparent section, and wherein the transparent section enables visible perception of the at least one first visible indicator when the at least one first visible indicator is active.

19. The system of claim 1, wherein the rapid shutdown device includes
   a shutdown receiver,
   a shutdown transmitter electrically connected to the shutdown receiver,
   a shutdown power circuit electrically connected to the shutdown receiver, and an indicator circuit electrically connected to the shutdown receiver and the shutdown power circuit,
      wherein the shutdown receiver, the shutdown transmitter and the shutdown power circuit are electrically connected to the photovoltaic modules,
   wherein the indicator circuit is electrically connected to the shutdown receiver and the shutdown power circuit,
   wherein the shutdown receiver is configured to detect a shutdown signal transmitted by the shutdown transmitter when the electrical voltage of the system is less than or equal to the predetermined voltage level, and
   wherein the indicator circuit is configured to receive the shutdown signal and activate the at least one first visible indicator and the at least one second visible indicator in response to the receipt of the shutdown signal.

20. The system of claim 19, wherein the shutdown signal is a shutdown code, and wherein the transmitter is configured to transmit the shutdown code to the shutdown receiver by wired communication or wireless communication.

* * * * *